US009100246B1

(12) United States Patent
TeNgaio et al.

(10) Patent No.: US 9,100,246 B1
(45) Date of Patent: Aug. 4, 2015

(54) DISTRIBUTED APPLICATION VIRTUALIZATION

(75) Inventors: Lance TeNgaio, Pleasant Grove, UT (US); Randall R. Cook, Springville, UT (US)

(73) Assignee: Symantec Corporation, Mountain View, CA (US)

( * ) Notice: Subject to any disclaimer, the term of this patent is extended or adjusted under 35 U.S.C. 154(b) by 1066 days.

(21) Appl. No.: 12/142,549

(22) Filed: Jun. 19, 2008

(51) Int. Cl.
*G06F 15/16* (2006.01)
*H04L 29/08* (2006.01)
*H04L 29/06* (2006.01)
*G06F 9/48* (2006.01)

(52) U.S. Cl.
CPC ............ *H04L 29/08099* (2013.01); *G06F 9/48* (2013.01); *H04L 29/06* (2013.01); *H04L 29/08009* (2013.01); *H04L 29/0809* (2013.01); *H04L 29/08081* (2013.01); *H04L 29/08117* (2013.01); *H04L 29/08135* (2013.01); *H04L 29/08144* (2013.01)

(58) Field of Classification Search
CPC ...................... H04L 29/0814; H04L 29/08144; H04L 29/06; H04L 29/08009; H04L 29/08135; H04L 29/08117; H04L 29/08099; H04L 29/0809; H04L 29/08081; G06F 9/48; G06F 9/04
USPC ............................... 709/219; 718/1, 100, 106
See application file for complete search history.

(56) References Cited

U.S. PATENT DOCUMENTS

| | | | | |
|---|---|---|---|---|
| 5,131,041 A | * | 7/1992 | Brunner et al. | 370/219 |
| 5,280,627 A | * | 1/1994 | Flaherty et al. | 713/2 |
| 5,394,526 A | * | 2/1995 | Crouse et al. | 709/219 |
| 5,471,617 A | * | 11/1995 | Farrand et al. | 718/100 |
| 5,623,600 A | * | 4/1997 | Ji et al. | 726/24 |
| 5,713,017 A | * | 1/1998 | Lin et al. | 1/1 |
| 5,796,393 A | * | 8/1998 | MacNaughton et al. | 715/733 |
| 5,822,529 A | * | 10/1998 | Kawai | 709/219 |
| 5,838,916 A | * | 11/1998 | Domenikos et al. | 709/219 |
| 5,862,346 A | * | 1/1999 | Kley et al. | 709/245 |
| 5,870,550 A | * | 2/1999 | Wesinger et al. | 709/218 |

(Continued)

OTHER PUBLICATIONS

Randall R. Cook; Dynamic Insertion and Removal of Virtual Software Sub-Layers; U.S. Appl. No. 12/058,782, filed Mar. 31, 2008.

(Continued)

*Primary Examiner* — Azizul Choudhury
*Assistant Examiner* — Anthony Fabbri
(74) *Attorney, Agent, or Firm* — ALG Intellectual Property, LLC

(57) ABSTRACT

Distributed application virtualization provides for the distribution, configuration and control of multiple application components, layered file systems, and configuration settings that may be applied on top of an operating system of each system configured to work in conjunction with other systems within a single distributed virtualization layer. A distributed software virtualization manager or service handles communication between systems within each distributed virtual layer. One distributed virtualization operation activates components, selected based on user-defined parameters, on systems across the network belonging to a selected distributed virtual application layer. Other virtualization operations, whether local and/or distributed, include capturing file system and configuration activity associated with the detected event and storing data representative of the captured file system and configuration activity to a virtual layer, such as a local or distributed application layer.

20 Claims, 10 Drawing Sheets

(56) References Cited

U.S. PATENT DOCUMENTS

| | | | | |
|---|---|---|---|---|
| 5,884,046 | A * | 3/1999 | Antonov | 709/238 |
| 5,909,681 | A * | 6/1999 | Passera et al. | 1/1 |
| 5,915,088 | A * | 6/1999 | Basavaiah et al. | 712/28 |
| 5,938,721 | A * | 8/1999 | Dussell et al. | 701/211 |
| 5,987,506 | A * | 11/1999 | Carter et al. | 709/213 |
| 5,996,022 | A * | 11/1999 | Krueger et al. | 709/247 |
| 6,014,686 | A * | 1/2000 | Elnozahy et al. | 709/202 |
| 6,108,703 | A * | 8/2000 | Leighton et al. | 709/226 |
| 6,119,165 | A * | 9/2000 | Li et al. | 709/229 |
| 6,128,647 | A * | 10/2000 | Haury | 709/207 |
| 6,182,086 | B1 * | 1/2001 | Lomet et al. | 1/1 |
| 6,212,548 | B1 * | 4/2001 | DeSimone et al. | 709/204 |
| 6,311,265 | B1 * | 10/2001 | Beckerle et al. | 712/203 |
| 6,317,773 | B1 * | 11/2001 | Cobb et al. | 718/101 |
| 6,324,590 | B1 * | 11/2001 | Jeffords et al. | 719/316 |
| 6,430,602 | B1 * | 8/2002 | Kay et al. | 709/206 |
| 6,507,875 | B1 * | 1/2003 | Mellen-Garnett et al. | 719/310 |
| 6,553,404 | B2 * | 4/2003 | Stern | 709/203 |
| 6,698,017 | B1 * | 2/2004 | Adamovits et al. | 717/168 |
| 6,742,023 | B1 * | 5/2004 | Fanning et al. | 709/219 |
| 6,789,114 | B1 * | 9/2004 | Garg et al. | 709/224 |
| 6,842,906 | B1 * | 1/2005 | Bowman-Amuah | 719/330 |
| 6,891,802 | B1 * | 5/2005 | Hubbard | 370/241 |
| 6,912,713 | B2 * | 6/2005 | Badovinatz et al. | 718/106 |
| 6,931,546 | B1 * | 8/2005 | Kouznetsov et al. | 726/23 |
| 6,934,740 | B1 * | 8/2005 | Lawande et al. | 709/213 |
| 6,973,549 | B1 * | 12/2005 | Testardi | 711/150 |
| 6,986,050 | B2 * | 1/2006 | Hypponen | 713/183 |
| 7,020,880 | B2 * | 3/2006 | Mellen-Garnett et al. | 719/310 |
| 7,028,305 | B2 * | 4/2006 | Schaefer | 719/310 |
| 7,076,553 | B2 * | 7/2006 | Chan et al. | 709/226 |
| 7,117,495 | B2 * | 10/2006 | Blaser et al. | 717/174 |
| 7,127,480 | B2 * | 10/2006 | Kline et al. | 711/162 |
| 7,162,724 | B2 | 1/2007 | Blaser et al. | |
| 7,165,260 | B2 * | 1/2007 | Blaser et al. | 719/328 |
| 7,433,935 | B1 * | 10/2008 | Obert | 709/219 |
| 7,451,196 | B1 * | 11/2008 | de Vries et al. | 709/220 |
| 7,461,086 | B1 | 12/2008 | Hurren et al. | |
| 7,461,096 | B1 | 12/2008 | Hurren et al. | |
| 7,496,931 | B2 | 2/2009 | Cook et al. | |
| 7,512,977 | B2 | 3/2009 | Cook et al. | |
| 7,519,963 | B1 | 4/2009 | Blaser et al. | |
| 7,542,988 | B1 | 6/2009 | Cook et al. | |
| 7,549,164 | B2 | 6/2009 | Cook et al. | |
| 7,606,867 | B1 * | 10/2009 | Singhal et al. | 709/209 |
| 7,620,956 | B2 | 11/2009 | Cook et al. | |
| 7,716,377 | B2 * | 5/2010 | Harris et al. | 709/248 |
| 7,877,413 | B1 | 1/2011 | Cook et al. | |
| 7,886,291 | B1 | 2/2011 | Jones et al. | |
| 7,945,897 | B1 * | 5/2011 | Cook | 717/121 |
| 7,970,789 | B1 * | 6/2011 | Blaser et al. | 707/783 |
| 8,010,961 | B1 | 8/2011 | Cook et al. | |
| 8,060,940 | B2 | 11/2011 | McCorkendale et al. | |
| 8,108,346 | B1 | 1/2012 | Hurren et al. | |
| 8,112,392 | B1 * | 2/2012 | Bunnell et al. | 707/625 |
| 8,112,767 | B1 | 2/2012 | Cook | |
| 8,127,290 | B2 * | 2/2012 | Suit | 718/1 |
| 8,180,861 | B2 * | 5/2012 | Hodgson et al. | 709/220 |
| 8,205,072 | B1 * | 6/2012 | Gentil et al. | 713/153 |
| 8,230,095 | B2 * | 7/2012 | Tsui et al. | 709/231 |
| 8,291,407 | B2 * | 10/2012 | Greenwood et al. | 717/174 |
| 8,315,999 | B2 * | 11/2012 | Chatley et al. | 707/705 |
| 8,336,108 | B2 * | 12/2012 | Suit et al. | 726/30 |
| 8,345,673 | B1 * | 1/2013 | Lo et al. | 370/366 |
| 8,352,624 | B2 * | 1/2013 | Zimmerman et al. | 709/231 |
| 8,467,534 | B2 * | 6/2013 | Patariu et al. | 380/277 |
| 8,694,623 | B1 * | 4/2014 | Stephen et al. | 709/224 |
| 8,812,651 | B1 * | 8/2014 | Eriksen et al. | 709/224 |
| 8,826,269 | B2 * | 9/2014 | Li et al. | 718/1 |
| 8,856,017 | B2 * | 10/2014 | Salonen | 705/5 |
| 8,887,283 | B2 * | 11/2014 | Crawford | 726/24 |
| 2002/0083183 | A1 | 6/2002 | Pujare et al. | |
| 2002/0116444 | A1 * | 8/2002 | Chaudhri et al. | 709/201 |
| 2002/0144256 | A1 * | 10/2002 | Budhiraja et al. | 717/174 |
| 2002/0161850 | A1 * | 10/2002 | Ulrich et al. | 709/214 |
| 2003/0056030 | A1 * | 3/2003 | Gao et al. | 709/330 |
| 2003/0224762 | A1 * | 12/2003 | Lau et al. | 455/412.2 |
| 2003/0233647 | A1 * | 12/2003 | Blaser et al. | 717/174 |
| 2004/0005873 | A1 * | 1/2004 | Groenendaal et al. | 455/410 |
| 2004/0078568 | A1 * | 4/2004 | Pham et al. | 713/165 |
| 2004/0107179 | A1 * | 6/2004 | Dalrymple et al. | 707/1 |
| 2004/0136246 | A1 * | 7/2004 | Kosuge | 365/200 |
| 2004/0139128 | A1 * | 7/2004 | Becker et al. | 707/204 |
| 2004/0162871 | A1 * | 8/2004 | Pabla et al. | 709/201 |
| 2004/0166895 | A1 * | 8/2004 | Koenck et al. | 455/556.1 |
| 2004/0187076 | A1 * | 9/2004 | Ki et al. | 715/513 |
| 2004/0255048 | A1 * | 12/2004 | Lev Ran et al. | 709/249 |
| 2004/0260761 | A1 * | 12/2004 | Leaute et al. | 709/201 |
| 2005/0033841 | A1 * | 2/2005 | McCarthy et al. | 709/225 |
| 2005/0064859 | A1 * | 3/2005 | Kotzin et al. | 455/419 |
| 2005/0076326 | A1 * | 4/2005 | McMillan et al. | 717/100 |
| 2005/0091652 | A1 * | 4/2005 | Ross et al. | 718/1 |
| 2005/0172279 | A1 * | 8/2005 | Cook et al. | 717/162 |
| 2005/0273853 | A1 * | 12/2005 | Oba et al. | 726/22 |
| 2005/0278441 | A1 * | 12/2005 | Bond et al. | 709/223 |
| 2006/0005171 | A1 * | 1/2006 | Ellison | 717/131 |
| 2006/0010203 | A1 * | 1/2006 | Mrsic-Flogel et al. | 709/205 |
| 2006/0041885 | A1 * | 2/2006 | Broquere et al. | 718/1 |
| 2006/0085530 | A1 * | 4/2006 | Garrett | 709/223 |
| 2006/0143247 | A1 * | 6/2006 | Poole et al. | 707/204 |
| 2006/0236323 | A1 * | 10/2006 | Neill et al. | 718/104 |
| 2007/0097934 | A1 * | 5/2007 | Walker et al. | 370/338 |
| 2007/0168641 | A1 * | 7/2007 | Hummel et al. | 711/206 |
| 2007/0180450 | A1 | 8/2007 | Croft et al. | |
| 2007/0288228 | A1 * | 12/2007 | Taillefer et al. | 703/28 |
| 2008/0091792 | A1 * | 4/2008 | Mei et al. | 709/217 |
| 2008/0101345 | A1 * | 5/2008 | Suzuki | 370/352 |
| 2008/0250222 | A1 * | 10/2008 | Gokhale et al. | 711/203 |
| 2008/0267178 | A1 * | 10/2008 | Emmerich et al. | 370/389 |
| 2009/0013321 | A1 * | 1/2009 | Mattiocco et al. | 718/1 |
| 2010/0037235 | A1 * | 2/2010 | Larimore et al. | 719/312 |
| 2010/0138823 | A1 * | 6/2010 | Thornley | 717/174 |
| 2010/0306764 | A1 * | 12/2010 | Khanna | 718/1 |
| 2011/0061045 | A1 * | 3/2011 | Phillips | 717/173 |

OTHER PUBLICATIONS

Non-Final Office Action received in related U.S. Appl. No. 12/058,782; Aug. 3, 2011.

Jordan Sanderson; Methods and Systems for Activating and Deactivating Virtualization Layers; U.S. Appl. No. 12/414,170, filed Mar. 30, 2009.

Jared Blaser; Process Tracking Application Layered System; U.S. Appl. No. 11/324,571, filed Jan. 3, 2006.

Karl Bunnell et al.; Methods and Systems for Merging Virtualization Sublayers; U.S. Appl. No. 12/396,969, filed Mar. 3, 2009.

Jeremy Hurren; Feature Based Software Virtualization; U.S. Appl. No. 11/960,706, filed Dec. 20, 2007.

Karl Bunnell et al.; Methods and Systems for Creating and Applying Patches for Virtualized Applications; U.S. Appl. No. 12/369,512, filed Feb. 11, 2009.

Randall Cook; Automatic Virtualization Based on User-Defined Criteria; U.S. Appl. No. 12/024,079, filed Jan. 31, 2008.

Cynthia Bringhurst; Systems and Methods for Virtualizing Software Associated with External Computer Hardware Devices; U.S. Appl. No. 12/554,413, filed Sep. 4, 2009.

Bradley Baird; Systems and Methods for Merging Virtual Layers; U.S. Appl. No. 12/843,098, filed Jul. 26, 2010.

Michael Spertus; Systems and Methods for Using Virtualization to Implement Information Rights Management; U.S. Appl. No. 12/715,213, filed Mar. 1, 2010.

Randall R. Cook; Dynamic Insertion and Removal of Virtual Software Sub-Layers; U.S. Appl. No. 13/551,576, filed Jul. 17, 2012.

Rajeev Nagar; Windows NT File System Internals—A Developer's Guide; Sep. 1997; Chapter 4, pp. 1-58.

Bradley Baird; Systems and Methods for Using Virtualization of Operating-System-Level Components to Facilitate Software Testing; U.S. Appl. No. 13/048,305, filed Mar. 15, 2011.

* cited by examiner

DISTRIBUTED APPLICATION VIRTUALIZATION

BACKGROUND INFORMATION

In computing, file system and registry libraries are typically used to maintain data descriptive of the configuration of a computing device. A file system generally includes data for translating a physical sector of a memory disc to a logical structure. The logical structure can be used by a computer operating system to access data stored in physical memory. Registry libraries generally include configuration data such as setup, user preference, software, hardware, and system parameters information. In a network having a large number of computing devices and associated users, each computer system may have user customizations that result in unique file systems on each system.

Certain operations, when executed by a computing device, introduce changes to file system and/or registry data. For example, operations may cause such data to be created, deleted, or modified. In some situations, changes to the file system or registry data may be undesirable or unmanageable, or may introduce instability into a computing system. As an example, when a computer program is conventionally installed to a computing device, the file system and/or registry data is typically updated. These changes can cause the computing device to become susceptible, or more susceptible than before, to potential problems such as unwanted deletions of configuration data, data redundancies, computer program versioning issues, execution of unwanted processes, inoperability of computer programs, corruption of registered application interfaces, and conflicts between computer programs. Network operations may spread these changes to systems through out the network.

Such problems are exacerbated for a network system administrator or organization maintaining a network and/or group of computer systems having a large number of computing devices and associated users. In such a configuration, events such as rogue installations of computer programs can easily introduce any of the problems listed above. Finding and correcting such problems can be very difficult and time consuming, if not impossible, in a large network and/or complex computer system.

To a certain degree, conventional system restore technologies can be used to restore individual file system and registry settings to a previous state when a problem is introduced into a specific individual computing system. Conventional individual system restore technologies typically capture static snapshots of an individual computing system configuration. Such snapshots must be captured prior to any problems occurring and stored in a manner that is available when problems do occur. As system restore snapshots must cover the entire computing system, they can tie up significant memory resources in each computing system within a network. Unfortunately, application of these snapshots is also limited to individual computing systems and often may not be universally applied to other network systems. The limited application of system snapshots is particularly apparent when the computer systems are using different base operating systems. Coordination of network-wide system restore operations can also tie up significant memory resources in each network administering system within a network.

BRIEF DESCRIPTION OF THE DRAWINGS

Various embodiments are described with reference to the accompanying drawings, wherein like reference numbers designate like elements, and in which.

DESCRIPTION OF EMBODIMENTS

Figure 1:
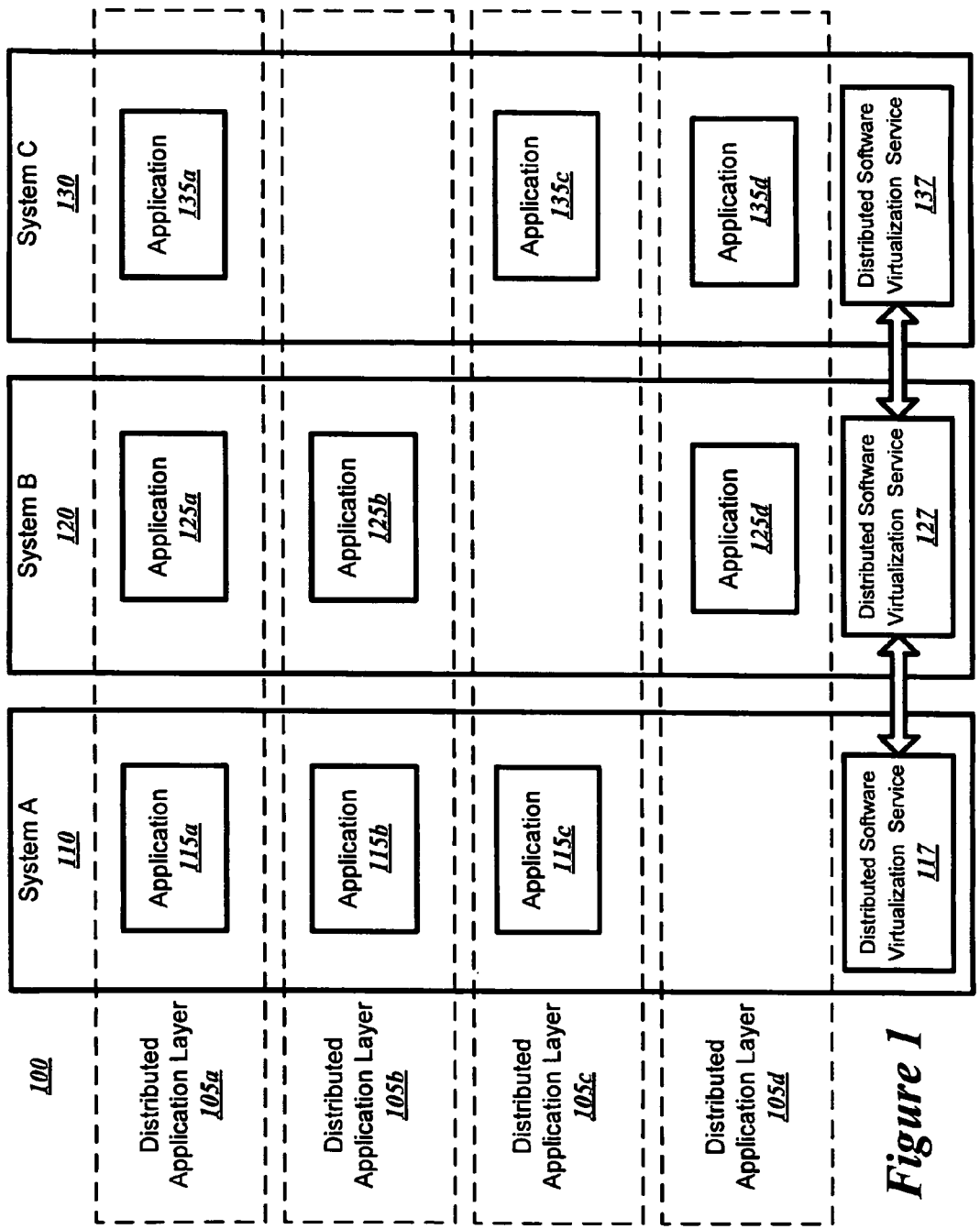
FIG. 1 illustrates a block diagram of a portion of a network of computing systems configured for distributed application virtualization in accordance with various embodiments of the present disclosure.

The disclosure is directed to distributed application virtualization. It should be appreciated that the examples disclosed herein may be implemented in numerous ways, including as one or more processes, apparatuses, systems, devices, methods, computer readable media, or computer program products embodied on computer readable media. Exemplary systems, apparatuses, computer program products embodied on computer readable media, and methods for distributed application virtualization are described herein. In the following description, reference is made to the accompanying drawings which form a part hereof wherein like numerals designate like parts throughout, and in which are shown, by way of illustration, specific embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of the present disclosure is defined by the appended claims and their equivalents.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," and "the" may include reference to both the singular and the plural. Reference in the specification to "one embodiment" or "an embodiment" means that a particular feature, structure, or characteristic described in connection with the embodiment is included in at least one embodiment of the disclosure. The meaning of "in" may include "in" and "on." The appearances of the phrases "in one embodiment" or "in an embodiment" in various places in the specification do not necessarily all refer to the same embodiment, but it may. The term "connected" may mean a logical, direct electrical, electromagnetic, mechanical, or other connection between the items connected, without any electrical, mechanical, logical or other intermediary there between. The term "coupled" can mean a direct connection between items, an indirect connection through one or more intermediaries, or communication between items in a manner that may not constitute a connection.

As used herein, the term "software" refers broadly to any set of computer readable instructions embodied on one or more computer readable media, the instructions being executable by a computing device. Software may include one or more computer programs or applications. Data related to software may include configuration data such as file system and registry data associated with the software, including data representative of file system and configuration activity associated with operation and/or installation of the software.

As used herein, the term "virtualization" refers to performance of one or more operations to virtually install software, including applications and data related to the software or software activity, to a computing device or system such that the software may be conveniently activated (i.e., "turned on" or "enabled") and deactivated (i.e., "turned off" or "disabled"). Upon virtualization of the software, files and settings (such as those normally contained in a registry) are relocated to separate areas of an operating subsystem (e.g., the files are relocated to another area of the same or different file system and application settings are relocated to another area of the registry) but made to "virtually" appear as if they are located in the normal expected locations (e.g., a file appears to be at c:\this.txt but it is actually located at d:\redirectArea\layerID-1234\SystemDrive\this.txt). When virtually installed software is activated, access requests associated with the virtually installed software are generally redirected from a base file system and configuration to a virtual engine subsystem having one or more memory locations to which the software and/or related data have been virtually installed. Files and settings associated with activated software are made to appear in the normal locations and all application operations that deal with files and settings are redirected to the appropriate redirect areas. When the virtually installed software is deactivated, access requests are not redirected, but allowed to pass through to the base file system and configuration. As soon as the redirection of virtual files and settings is stopped, they disappear from the normal location, but for most operations remain located in the redirect area. In actuality, the files and settings associated with the virtually installed software application were never located in the normal location. As such, no further access to the virtually installed software application is possible upon deactivation, because the files and settings are inaccessible in the redirect area. Thus, while virtualized software applications do change the base file system and registry, the changes are made in separate locations that leave the main "overlapping" locations untouched. Thus, virtually installed and activated software may be executed without changing critical sections of the base file system and configuration of a computing device. Examples of virtualization operations include activating, deactivating, exporting, importing, deleting, resetting and capturing. How each of these virtualization operations will operate on data and software will be described further below.

As used herein, the term "distributed" refers to elements configured to enable multiple computer device systems to coordinate activities and to share resources of the constituent system hardware, software, and data. When distributed software is virtually installed and enabled in a virtual distributed application layer, requests and operations associated with the distributed software may be received and processed from local and other computer device systems who are properly associated with the layer and are generally redirected by a distributed software virtualization manager or service from a local base file system and configuration to one or more memory locations to which the software and/or related data has been virtually installed. When the virtually installed distributed software is disabled, requests by constituent systems are not redirected, but allowed to pass through to the local base file system and configuration of the respective constituent system making the request. Thus, virtually installed and activated distributed software on a distributed application layer may be globally utilized by systems having access to the distributed application layer without changing the base file system and configuration of a local computing device. Examples of distributed applications, operations, and/or layers will be described further below.

As described in more detail further below, data representative of a request or notification may be received and utilized to selectively determine one or more virtualization operations to be performed. For example, one or more virtualization operations may be automatically executed in response to a detected request or notification. The virtualization operations may be selected based at least in part on the content of the received request or notification. Accordingly, a user and/or constituent system of a virtual layer may provide a request or notification to be used to control virtualization operations, including when, how, and what virtualization operations are performed. In certain embodiments, the request or notification may provide a granular level of control over virtualization operations, including capabilities for controlling selective and automatic virtualization of software and/or related data associated with a specific event, process, parameter, or other criterion. This gives a user (e.g., a system administrator of a network) significant flexibility for controlling virtualization operations and for protecting each computing system in a network on a granular level from unwanted, unmanageable, and potentially harmful events such as rogue installations of software.

In an effort to clarify comparative phrases used in the specification and the claims of this disclosure, please note that the following phrases take at least the meanings indicated and associated herein, unless the context clearly dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(A B) or (B)", that is "A" is optional.

Turning now to the drawings, FIG. 1 illustrates a portion of a network 100 (or simply "the network 100") of computing systems 110, 120, 130 employing distributed application virtualization. Each computing system (110, 120, and 130) being configured for distributed application virtualization across multiple active distributed application layers 105*a*-105*d* as described herein. As shown, each computing system (110, 120, and 130) may include a distributed software virtualization manager or service (117, 127, and 137) coupled to other systems in the network 100. Each computing system (110, 120, and 130) may include various active applications (115*a*-115*c*, 125*a*-125*d*, and 135*a*-135*d*) each being associated with a respective active distributed application layer 105*a*-105*d*. Among other items not shown in FIG. 1 are local active applications not currently associated with an active distributed application layer 105a-105d and/or any deactivated distributed application layers.

In various embodiments, each computing system (110, 120, and 130) may have multiple applications active in a given virtual distributed application layer. For example, distributed application layer 105a illustrates at least three active applications 115a, 125a, 135a. Moreover, multiple applications may exist on a local system within a distributed application layer. For example, if distributed application layer 105a and 105b were part of the same layer, then System A would be running two applications (115a and 115b) and System B would also be running two applications (125a and 125b) on the same layer. Other embodiments provide that a single application may be active in multiple distributed application layers 105a-105d. For example, if application 115a, application 125a, and application 135a were the same application or if application 115a, application 115b, and application 115c were the same application.

In certain embodiments, the network 100 may include any computer hardware and/or instructions (e.g., software programs), or combinations of software and hardware, configured to perform the processes described herein. In particular, it should be understood that network 100 may include any of a number of computing devices, and may employ any of a number of computer operating systems, including, but by no means limited to, known versions and/or varieties of the Microsoft Windows, UNIX, Macintosh, and Linux operating systems. For example, each computing system (110, 120, and 130) in network 100 may be configured to use different operating systems, the same operating system, or some combination of operating systems.

Accordingly, the distributed processes/methods described herein may oft be implemented at least in part as instructions for network devices, e.g., one or more computer program products, embodied on computer readable media and executable by one or more computing devices. In general, a processor (e.g., a microprocessor) on one or more systems of the network 100 receives instructions, e.g., from a memory, a computer readable medium, etc., and executes those instructions, thereby performing one or more processes, including one or more of the processes described herein. Such instructions may be stored and transmitted using a variety of known computer readable media.

A computer readable medium (also referred to as a processor readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary network 100 is shown in FIG. 1, the exemplary components illustrated in FIG. 1 are not intended to be limiting. Indeed, additional or alternative components, implementations, or computing systems may be used to implement the principles and processes described herein.

Figure 2:
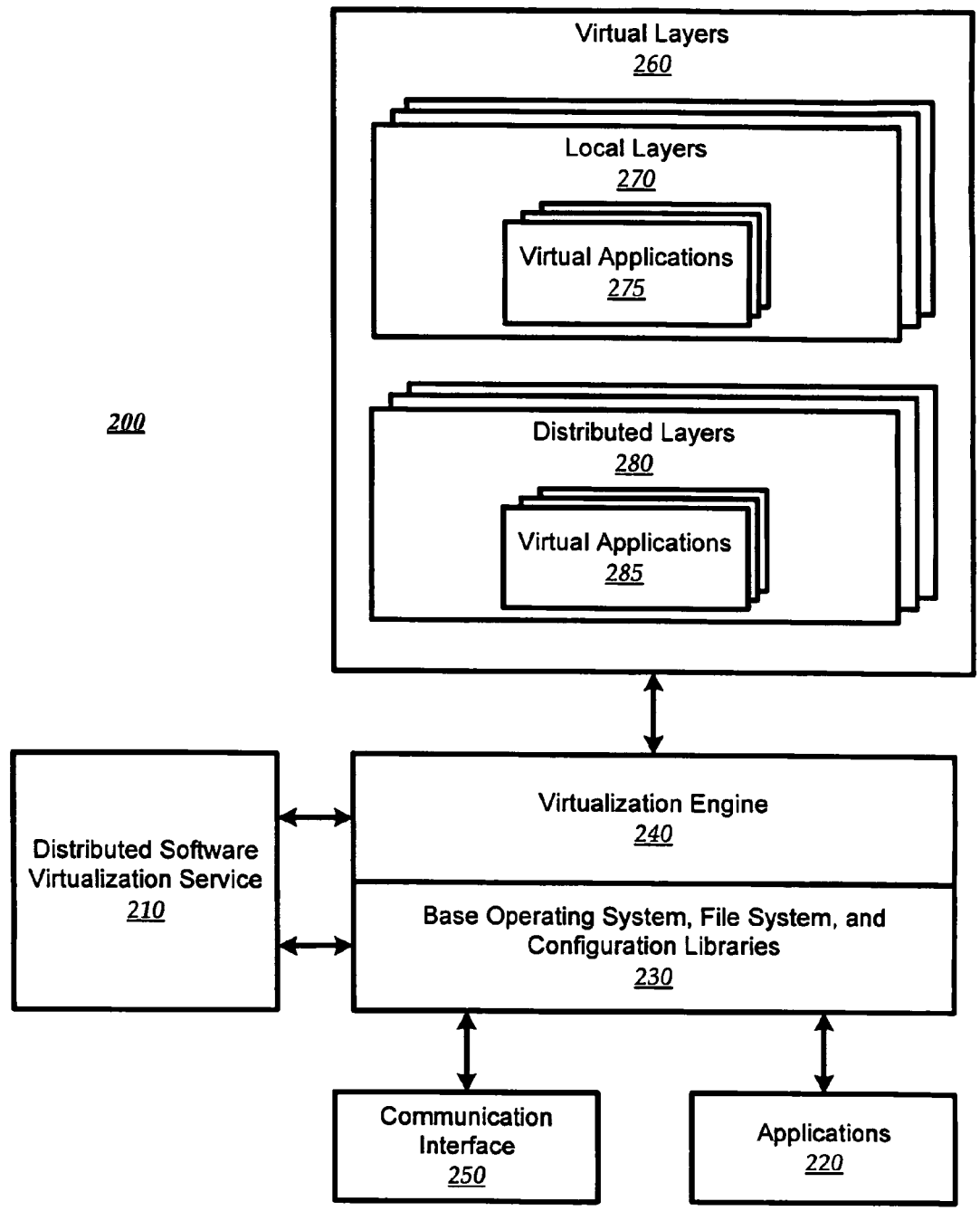
FIG. 2 illustrates a block diagram of a portion of a distributed virtualization system in a computing device environment in accordance with various embodiments of the present disclosure.

Referring now to FIG. 2, a portion of a distributed virtualization system 200 in a computing device environment, such as one of the computing systems 110, 120, 130 of FIG. 1, is shown in accordance with various embodiments of the present disclosure. As shown in FIG. 2, distributed virtualization system 200 may include a distributed software virtualization manager or service 210, one or more applications 220 (e.g., software applications), a base system 230, a virtualization engine 240, and a communication interface 250. The virtualization engine 240 is coupled to the distributed software virtualization service 210 and various virtual layer(s) 260 that may include both local layer(s) 270 running local virtual application(s) 275 and distributed layer(s) 280 running distributed virtual application(s) 285.

Distributed software virtualization service 210 may include hardware, computer-readable instructions embodied in a computer-readable medium, or a combination of hardware and computer-readable instructions. In various embodiments, distributed software virtualization service 210 comprises computing instructions, e.g., a computer program product, implemented in a computer-readable medium and configured to direct a processor to perform one or more of the distributed virtualization operations disclosed herein.

The distributed software virtualization service 210 may be configured to enable a user of the virtualization system 200 to define, manage, and control distributed virtualization operations. In one embodiment, the distributed virtualization operations which may be implemented by the distributed software virtualization service 210 include at least one of activating a distributed application/layer, deactivating an active distributed application/layer, resetting a designated distributed application/layer, importing a received distributed application/layer, exporting a selected distributed application/layer, and deleting a distributed application/layer. Many of the distributed virtualization operations and related processes will be described in further detail in FIGS. 5-10 below.

Automatic distributed virtualization operations may be implemented to protect a computing device and/or system. For example, a user, such as a network administrator, may utilize one or more tools provided by distributed software virtualization service 210 to provide distributed parameters for controlling automatic virtualization operations. The user may tailor the parameters as may best suit a particular computing device, system, or implementation. With distributed parameters activated, distributed software virtualization service 210 and/or virtualization engine 240 can monitor for and detect events identified by the distributed parameters and automatically and selectively perform one or more virtualization operations based on the distributed parameters.

In the example described above, for instance, when a rogue installation of a software application is initiated on a computing device, the distributed software virtualization service 210 and/or virtualization engine 240 may detect the installation being initiated and automatically convert the attempted actual installation to a virtual installation to protect the computing device and associated computing systems from the risks associated with making changes to the file systems and the configuration libraries of the base system 230 as would normally occur in an actual installation of software.

In certain embodiments, automatic virtualization of a software application in response to a detected event may be established, in the distributed parameters, as a default to be performed when the event is detected. For example, an administrator of system 200 may want different automatic virtualization operations to be performed for different applications. For instance, the distributed parameters may be defined such that when a request or notification is received to activate a distributed application, the virtualization engine 240 does not automatically activate the distributed application, but instead performs an ordered activation of related applications prior to activating the requested distributed application. Alternatively, the distributed software virtualization service 210 might also first query a neighboring system with an associated distributed layer 280 to determine if a suitable distributed application is running remotely.

The automatic virtualization operations can, of course, be modified by a user changing the distributed parameters. For example, an administrator of system 200 may want different automatic virtualization operations to be performed for different users. For instance, the distributed parameters may be defined such that when a user or user type having certain privileges in the system 200 (i.e., a "privileged user" or "administrator") initiates an installation of a software application, the virtualization engine 240 does not automatically perform a virtual installation in lieu of an actual installation, but instead performs some other action, such as allowing the actual installation of the software application to proceed and/or prompting the privileged user to confirm that an actual installation should be performed. When a user or user type lacking certain privileges in the system 200 (i.e., a "non-privileged user" or "client") initiates an installation of a software application, the virtualization engine 240 may be configured to automatically perform one or more virtual installation operations based on the distributed parameters, including virtually installing the software application as described above.

The base system 230 includes operating system, file system, and configuration libraries for use in executing the functions of the operating system including operating file systems, configuration settings such as registries, and other operating system functions. The distributed virtualization system 200 is generally implemented in a computing environment in which the base system 230 includes a network capable operating system coupled to at least one communication interface 250 configured to communicate with other systems in the network. The base system 230 forming an operational platform upon which one or more applications 220 (e.g., software applications and/or network application) can be run and files can be accessed in file systems. In conjunction with the base system 230, the virtualization engine 240 forms a virtual operational platform upon which one or more of the applications 220 may be virtualized and transformed into a virtual application 275 and 285 so that they may run virtually.

In certain embodiments, the operating system of the base system 230 includes known versions and/or varieties of Microsoft Windows operating system software. Other computer operating systems, including, but by no means limited to, known versions and/or varieties of the UNIX, Macintosh, and Linux operating systems may also be used in the base system 230. The base system 230 may also include a variety of configuration settings (e.g., registry settings) and files that are available to applications 220 and virtual applications 275 and 285 for reading and writing operations. The base configuration settings and files, including the files and configuration settings of the base operating system, may be stored to a particular location in memory of the virtualization system 200.

Virtual layers 260, such as local layers 270 and distributed layers 280, may include any content and/or data, including configuration data (e.g., captured file system and configuration data) associated with the software application to be virtualized. A virtual layer 260 may be created at one or more memory locations that are isolated from the memory locations of file systems and configuration libraries of the base system 230. Instead of overwriting the memory locations of file systems and configuration libraries of the base system 230 as may happen in an actual installation of a software package, in a virtual installation the contents of the software package and/or other data are stored to one or more other memory locations as virtual layer 260, so as to preserve the contents of base file system and configuration 230. The distributed software virtualization service 210 and the virtualization engine 240 may be configured to redirect access requests for data in file systems and configuration libraries of the base system 230 to the respective virtual layer 260, as described further below.

Virtualization operations may also include generating and storing mapping data for each virtual layer 260. The mapping data may include any information potentially helpful for identifying an appropriate location in memory (e.g., virtual layer 260) to which an access request should be directed. Information in the mapping data may be formatted and organized in any way that is suitable for the information to be used for redirecting access requests, enabling/activating virtual layer 260, and disabling/deactivating virtual layer 260, as described further below. In certain embodiments, the mapping data includes one or more tables of information organized such that the information can be searched by index, keyword, or other parameter.

As an example of generating mapping data, assume that an application includes a particular application object (e.g., a DLL file) designed to replace a file object that is part of file systems and configuration libraries of the base system 230. During virtual installation of the application, the virtualization engine 240 can identify the file object and/or its location (e.g., pathname), the application object and/or its location in at least one of the virtual layers 260, and the relationship between the file object and the application object and/or their respective locations. References to the identified information may be recorded and included as part of the mapping data. In this or another suitable manner, the mapping data can be said to define relationships between the content of the virtual layer 260 and the content of file systems and configuration libraries of the base system 230.

In various embodiments, once a virtual layer 260 is installed it may then be enabled/activated or disabled/deactivated. Accordingly, the distributed software virtualization service 210 and/or the virtualization engine 240 may each be configured to enable a virtual layer 260. In one embodiment, when the virtual layer 260 is associated with a virtually installed software application (275 and/or 285), enabling the virtual layer 260 activates the associated software application such that its functions may be executed by a computing device. Disabling the virtual layer 260 deactivates the software application such it will not be executed by the computing device.

In various embodiments, enablement of virtual layer 260 includes activating mapping data associated with the virtual layer 260 by applying the mapping data to the virtualization engine 240. In various embodiments, this includes injecting mapping data into an operating system kernel filter driver of the virtualization engine 240. Similarly, removal of mapping data from the virtualization engine 240 may set the virtualization engine 240 to a state in which access requests for file systems and configuration libraries of the base system 230 will no longer be redirected to an associated disabled virtual layer 260, but will be allowed to pass through to file systems and configuration libraries of the base system 230.

With mapping data activated, the virtualization engine 240 is configured to selectively redirect certain access requests from file systems and configuration libraries of the base system 230 to the virtual layers 260 (e.g., local layers 270 and/or distributed layers 280). For example, virtualization engine 240 may intercept an access request from an application 220, the request including a reference for a particular file object or memory location in one of the file systems and/or configuration libraries of the base system 230. The virtualization engine 240 may use the activated mapping data to determine whether the reference is associated with enabled virtual layer 260. This determination may be performed in any suitable manner, including searching the mapping data for the reference. If a match is found, the virtualization engine 240 may redirect the access request to a corresponding object in virtual layer 260. The corresponding object may then be accessed and returned to the application 220, the application 220 being unaware of the redirection having taken place. Accordingly, from the view of the application 220, it is as if the content associated with the virtually installed and enabled virtual layer 260 had been actually installed to file systems and configuration libraries of the base system 230.

In one embodiment, the distributed software virtualization service 210 is configured to selectively redirect certain access requests and notifications from remote systems to the distributed layers 280. For example, distributed software virtualization service 210 may intercept an access request received from a remote application, the request including a reference for a particular file object or memory location. The distributed software virtualization service 210 may direct the use of the activated mapping data to determine whether the reference is associated with an enabled distributed layer 280. This determination may be performed in any suitable manner, including searching the mapping data for the reference. If a match is found, the distributed software virtualization service 210 via the virtualization engine 240 may redirect the remote access request to a corresponding object in distributed layer 280. The corresponding object may then be accessed and returned to the remote application, the remote application being unaware of the redirection having taken place. Accordingly, from the view of the remote application, it is as if the content associated with the virtually installed and enabled distributed layer 280 had been actually installed to the file systems and/or the configuration libraries of the base system 230.

The virtualization engine 240 may be configured to selectively, individually, and conveniently disable an enabled layer, including virtual layer 260. This may be performed in any suitable manner, including removing mapping data from the virtualization engine 240. Accordingly, in one embodiment, when a virtual layer 260 is disabled/deactivated, the virtualization engine 240 will permit access requests (e.g., access requests generated by applications 220) to pass through to file systems and configuration libraries of the base system 230, without being considered for redirection to virtual layer 260. In other words, when the virtual layer 260 is not enabled, the virtualization engine 240 is configured not to redirect access requests to virtual layer 260.

Although many of the examples below refer to a computing device with a single operating system, file system and configuration library, the concepts, principles, and examples disclosed below may be extended to provide automatic software virtualization functionality across several or many operating systems, file systems, and/or configurations libraries (e.g., registries). Accordingly, it is contemplated that the principles described herein may be applied to these and other computing systems and devices, both existing and yet to be developed, using the methods and principles disclosed herein.

As shown in FIG. 2, the virtualization system 200 may include a virtualization engine 240, which may include any hardware (e.g., a processor), computer-readable instructions (e.g., a computer program product), or combination thereof configured to perform one or more of the operations disclosed herein. In certain embodiments, virtualization engine 240 may be implemented as a software agent installed to a computing device. The virtualization engine 240 and exemplary operations that may be performed by the virtualization engine 240 will be described further below.

In various embodiments, the distributed software virtualization service 210 may be implemented by virtualization engine 240. The virtualization engine 240 with access to the distributed software virtualization service 210 may be configured to enable a user (e.g., a network administrator) to define and manage and control distributed virtualization operations, layers, applications, members, and other actions performed on the distributed layers 280 and associated distributed virtual applications 285. For example in one embodiment, the virtualization engine 240 may reconfigure various selected local application layers 270 and associated local virtual applications 275 into distributed layers 280 and distributed virtual applications 285 based on information received from the distributed software virtualization service 210. Another example may include the virtualization engine 240 reconfiguring selected local applications 220 into distributed layers 280 and distributed virtual applications 285 based on information received from the distributed software virtualization service 210. In one embodiment, the virtualization engine 240 may also reconfigure selected local applications 220 into local application layers 270 and associated local virtual applications 275.

In one embodiment, a distributed virtualization operation includes at least one of activating a distributed application/layer, deactivating an active distributed application/layer, resetting a designated distributed application/layer, importing a received distributed application/layer, exporting a selected distributed application/layer, deleting a distributed application/layer, and combinations thereof including automatic ordered implementation of multiple distributed virtualization operations. As mentioned, the virtualization engine 240 may perform any of the distributed virtualization operations described above to virtualize the software application.

In some examples, this may include creating a virtual layer 260 for the application, capturing data and/or activity associated with the application (e.g., file system and configuration activity associated with an installation of the application), and storing content of the application and/or captured data to the virtual layers 260. If the virtualized software application is to be a distributed virtual application 285, the distributed software virtualization service 210 notifies other systems associated with the target distributed virtual layer 280 to the newly added distributed virtual application 285.

Distributed software virtualization service 210 and/or virtualization engine 240 may be configured to provide one or more parameter definition tools that may be utilized by a user of a remote computing device or the local virtualization engine 240 to provide input defining distributed virtualization parameters. For example, distributed software virtualization service 210 may be configured to provide one or more user interfaces (e.g., graphical user interfaces) configured to provide output to and receive input from a user at each system associated with the distributed application layer. Examples of distributed parameter definition tools include, but are in no way limited to, one or more lists of selectable parameter options from which at least one user of a system associated with the distributed application layer may select or define a set of one or more parameters, data fields into which a user may insert input, and any other suitable mechanisms for receiving user input or system notifications defining distributed virtualization.

Distributed virtualization parameters may include any data defined by a user or included in a distributed notification or request using the distributed software virtualization service 210, which can be used to select, trigger initiation of, or otherwise control one or more distributed virtualization operations. Examples of distributed virtualization parameters may include, but are not limited to, data descriptive of process types (e.g., distributed software installation processes), specific distributed processes (e.g., particular processes or operations associated with a distributed software installation), distributed file system locations (e.g., distributed application layer locations associated with certain data, functions, or physical memory sectors), distributed schedules (e.g., time of day, day of month, off-peak times, peak times, operation time, non-use or shut down time, end of month, etc.), user profiles, user roles, user privileges, user types (e.g., privileged versus non-privileged users), physical locations of computing devices across the distributed application layer, network resources, network addresses, and network locations of computing devices (e.g., inside or outside of a firewall).

As an example, a user may define parameters descriptive of distributed software installation events (e.g., a call to or initiation of a distributed installer application or process) such that one or more distributed virtualization operations will be automatically selected and performed when occurrences of distributed software installation events described by the parameters are detected. For instance, a user may provide input defining a particular file type (e.g., a file having an ".msi" extension) as a parameter to control distributed virtualization operations, or a user may provide input defining a particular file name (e.g., "setup.exe." or "install.exe") and/or file location (e.g., "system A" or "systems A-C") as a parameter to control virtualization operations. As described below, events such as function calls or initiation of processes associated with the user-defined criteria such as file types and/or file names may be detected and may trigger selection and performance of one or more distributed virtualization operations.

User-defined parameters may be defined at a low level of granularity to provide significant flexibility and control over performance of virtualization operations on the virtual layers 260. For example, a user may define parameters that are process specific such that virtualization operations are automatically performed only in response to and for activity (e.g., file system and configuration activity) associated with a specific process or virtual application (275 and 285). This low-level granularity generally provides improved flexibility and control as compared to conventional system restore point technologies that merely use a static, system-wide snapshot to restore a computing system to a previous state.

Distributed software virtualization service 210 may receive user input defining virtualization parameters, and utilize the user-defined virtualization parameters to establish one or more sets of rules for controlling automatic virtualization operations. Such a set of rules may include one or more distributed parameters and may be referred to as virtualization heuristic. In one embodiment, the virtualization engine 240 is also configured to implement and utilize distributed parameters and/or virtualization heuristics to control virtualization operations. Accordingly, distributed parameters may be used to establish a virtualization heuristic at the distributed software virtualization service 210 or the virtualization engine 240, which may then be applied to the virtual layers 260. Distributed parameters and/or virtualization heuristics may also be stored locally or distributed to other systems in the network via communication interface 250 by distributed software virtualization service 210.

Distributed parameters may be activated, i.e., configured to control automatic virtualization operations in system 200. In certain embodiments, activation includes providing data representative of distributed parameters to virtualization engine 240. As shown in FIG. 2, distributed software virtualization service 210 is communicatively coupled to the virtualization engine 240. Data representative of one or more distributed parameters may be provided to the virtualization engine 240 using any suitable communication technologies. In certain embodiments, the data associated with one or more user-defined distributed parameters may be transmitted by the distributed software virtualization service 210 over an attached network via communication interface 250 using any of the communication technologies mentioned herein.

In one embodiment, virtualization engine 240 may include a detection module having access to available virtualization heuristics and distributed parameters which may be implemented in the virtualization engine 240. Likewise, the distributed software virtualization service 210 may also include a detection module having access to available distributed virtualization heuristics and distributed parameters. In either case, the detection modules may be configured to monitor for and detect occurrences of one or more events defined by the distributed parameters. As an example, the detection module may detect an initiation of a software installation process identified by the distributed parameters. As another example, the detection module may detect a request for access to specific data or data on a particular device at a particular memory location as identified by the distributed parameters.

The detection module may be configured to use any suitable technologies to detect occurrences of events defined by the distributed parameters. For example, the detection module may monitor the communication interface 250 or base system 230 for certain access requests or function calls as defined by distributed parameters. In certain embodiments, the detection module may be implemented at an OS kernel level of the base system 230 and/or as part of network operating system (NOS). For example, a filter driver configured with or having access to data representative of virtualization heuristic and/or distributed parameters may be implemented at the OS kernel level and used to monitor for events defined by the parameters.

As one example, detection module may detect initiation of a software install process, an event defined by the distributed parameters. For instance, a user of system 200 may initiate a process to install a particular software application, and the detection module may detect this event. In response, the distributed software virtualization service 210 and/or virtualization engine 240 may automatically initiate one or more virtualization operations based on distributed parameters, including performing and/or directing execution of any of the following operations: selectively capturing the software application, including file system and configuration activity associated with the software application and/or installation of the software application, generating one or more virtual layers, storing the captured data to the virtual layers, and generating mapping data for redirecting access requests from file systems and configuration libraries of the base system 230 to the virtual layers 260.

The distributed software virtualization service 210 and/or virtualization engine 240 may be configured to automatically perform, or direct execution of, one or more virtualization operations based on the virtualization heuristic and/or distributed parameters. For example, in response to the detection module detecting an occurrence of an event defined by the distributed parameters, the virtualization engine 240 may select and initiate one or more virtualization operations, including, for example, creating one or more virtual layers 260, capturing file system and configuration activity and/or other data associated with the event, and storing data representative of the captured activity to the virtual layers 260. Exemplary virtualization processes and operations, which may be automatically initiated and performed by the distributed software virtualization service 210 and/or the virtualization engine 240 based on user defined-parameters, are described in greater detail with reference to FIGS. 5-10 below.

In various embodiments, the virtualization system 200 is also configured to operate in an unvirtualized state in which there is no software applications are virtually installed or enabled in the computing environment. Accordingly, the distributed software virtualization service 210 and the virtualization engine 240 are generally configured to permit access requests from the applications 220 to continue on to content in the file systems and configuration libraries of the base system 230. Alternatively, the system 200 may also operate in a mixed state of virtualization, where various software applications may be installed or enabled in the computing environment according to some combination of a distributed virtual state, a local virtual state, and/or an unvirtualized state. Accordingly, the distributed software virtualization service 210 and the virtualization engine 240 are generally configured to permit access requests from the applications 220 and the virtual applications 275 and 285 to continue on to content in both the file systems and configuration libraries of the base system 230, resources of the virtual layers 260, and distributed network resources via communication interface 250.

In one embodiment, the virtualization computing system 200 may include a distributed software management system configured to create and/or maintain at least one distributed virtual layer having at least one distributed application configured for operation by the originating computing device system and at least one other computing device system (e.g., 333, 335, or 337) and a local software management system configured to create and/or maintain at least one local virtual layer having at least one virtual application configured for operation by the originating computing device system. In various embodiments, the distributed and local software management system may include a virtualization manager, which may be implemented by a software management module and/or a computing device associated with at least one of the distributed software virtualization service 210, the base system 230, and/or the virtualization engine 240. In this manner, local and/or distributed functions of the virtualization manager may be performed by available resources associated with either or both the software management module and the computing device. Accordingly, the distributed virtualization manager of one embodiment may be configured to receive and generate distributed application layer data exchanged via notifications and/or requests transmitted using communication interface 250.

As previously indicated, the virtualization computing system 200 described with reference to FIG. 2 may be implemented in a variety of computing device environments. For example, the virtualization computing system 200 may be suitable for use as one or more of the computing device systems 110, 120, or 130 illustrated in FIG. 1 or the computing systems 333, 335, or 337 illustrated in FIG. 3 or the computing systems 413, 415, or 417 illustrated in FIG. 4. In other embodiments, certain components of the virtualization system 200 may be implemented in a computing device environment of one or more computing device systems (e.g., 110, 120, or 130 in FIG. 1 and/or 333, 335, 337 in FIG. 3 and/or 413, 415, 417 in FIG. 4) and certain other components of the virtualization system 200 may be implemented in a distributed software virtualization service (117, 127, or 137 in FIG. 1 and/or 310 in FIG. 3 and/or 430 in FIG. 4). As previously described in other embodiments, components of the virtualization system 200 may also be distributed across both a computing device system and the distributed software virtualization service.

Figure 3:
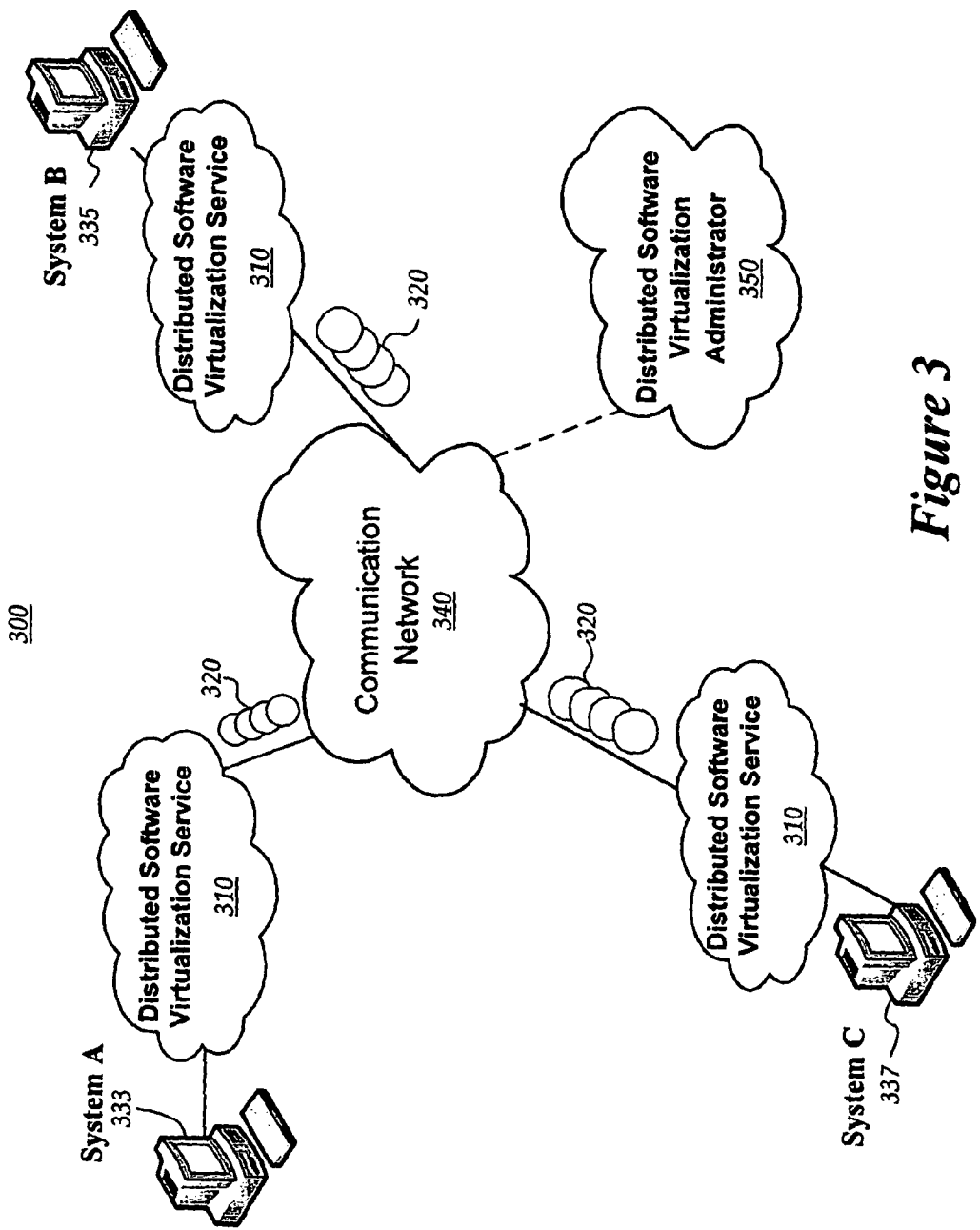
FIG. 3 illustrates a suitable distributed software virtualization environment configured for a network of computing systems in accordance with various embodiments of the present disclosure.

Referring now to FIG. 3, a suitable distributed application virtualization environment configured for a distributed network 300 is shown in accordance with various embodiments of the present disclosure. The distributed network 300 includes computing systems 333, 335, and 337 each coupled to communication network 340.

As shown, each computing device system (333, 335, and 337) in the distributed network 300 may include a distributed software virtualization service 310 communicatively coupled to other computing device systems. The distributed software virtualization service 310 and thereby each computing device system (333, 335, and 337) may communicate notifications and/or requests 320 with one another using any suitable communication technologies. For example, the distributed software virtualization service 310 and computing device systems (333, 335, and 337) may communicate over a communication network 340 using any suitable communication technologies, including suitable network communication technologies, devices, signals, and protocols capable of supporting the processes and communications described herein.

Communication network 340 may include any type, number, and configuration of networks capable of carrying communication signals between devices connected to the communication network 340, including but not limited to a local area network, a wide area network, a peer-to-peer network, a wireless network, a data network, an intranet, the Internet, and combinations or sub-combinations thereof. In other embodiments, the distributed software virtualization service 310 and the computing device systems (333, 335, and 337) may communicate directly, such as over a communication bus or other communication link.

A distributed software virtualization administrator 350 may include or be implemented in one or more devices, including one or more devices configured to communicate with computing systems 333, 335, and 337 over communication network 340. In one embodiment, the distributed software virtualization administrator 350 may be included or be implemented on at least one of the computing device systems (333, 335, and 337).

As previously indicated, notifications and/or requests 320 may be used by the distributed software virtualization service 310 to implement and utilize various parameters and/or virtualization heuristics to control distributed virtualization operations. In one embodiment, the distributed virtualization operations which may be implemented by the distributed software virtualization service 310 and administered by the distributed software virtualization administrator 350 include at least one of activating a distributed application/layer, deactivating an active distributed application/layer, resetting a designated distributed application/layer, importing a received distributed application/layer, exporting a selected distributed application/layer, and deleting a distributed application/layer.

Each of the computing device systems (333, 335, and 337) may include a distributed software management system configured to create and/or maintain at least one distributed virtual layer having at least one distributed application configured for operation by the originating computing device system and at least one other computing device system (e.g., 333, 335, or 337) and a local software management system configured to create and/or maintain at least one local virtual layer having at least one virtual application configured for operation by the originating computing device system. In various embodiments, a distributed virtualization manager may be implemented in at least one of a software management module and the computing device systems (333, 335, and 337), such that functions of the distributed virtualization manager may be performed by either or both the software management module and the computing device system. In one embodiment, the distributed virtualization manager may be configured to receive and generate distributed application layer data exchanged via notifications and/or requests 320 transmitted on the distributed software virtualization service 310 by a user, such as distributed software virtualization administrator 350.

Although a distributed network 300 as illustrated in FIG. 3 typically lowers the relative network overhead used to maintain the distributed virtual layers, communication across the communication network 340 may increase depending on network configuration and the level on interconnectivity. As such, the illustrated distributed network 300 may be preferred in smaller networks. In contrast, larger enterprise solutions may prefer a client/server configuration, more similar to the network 400 illustrated in FIG. 4.

Figure 4:
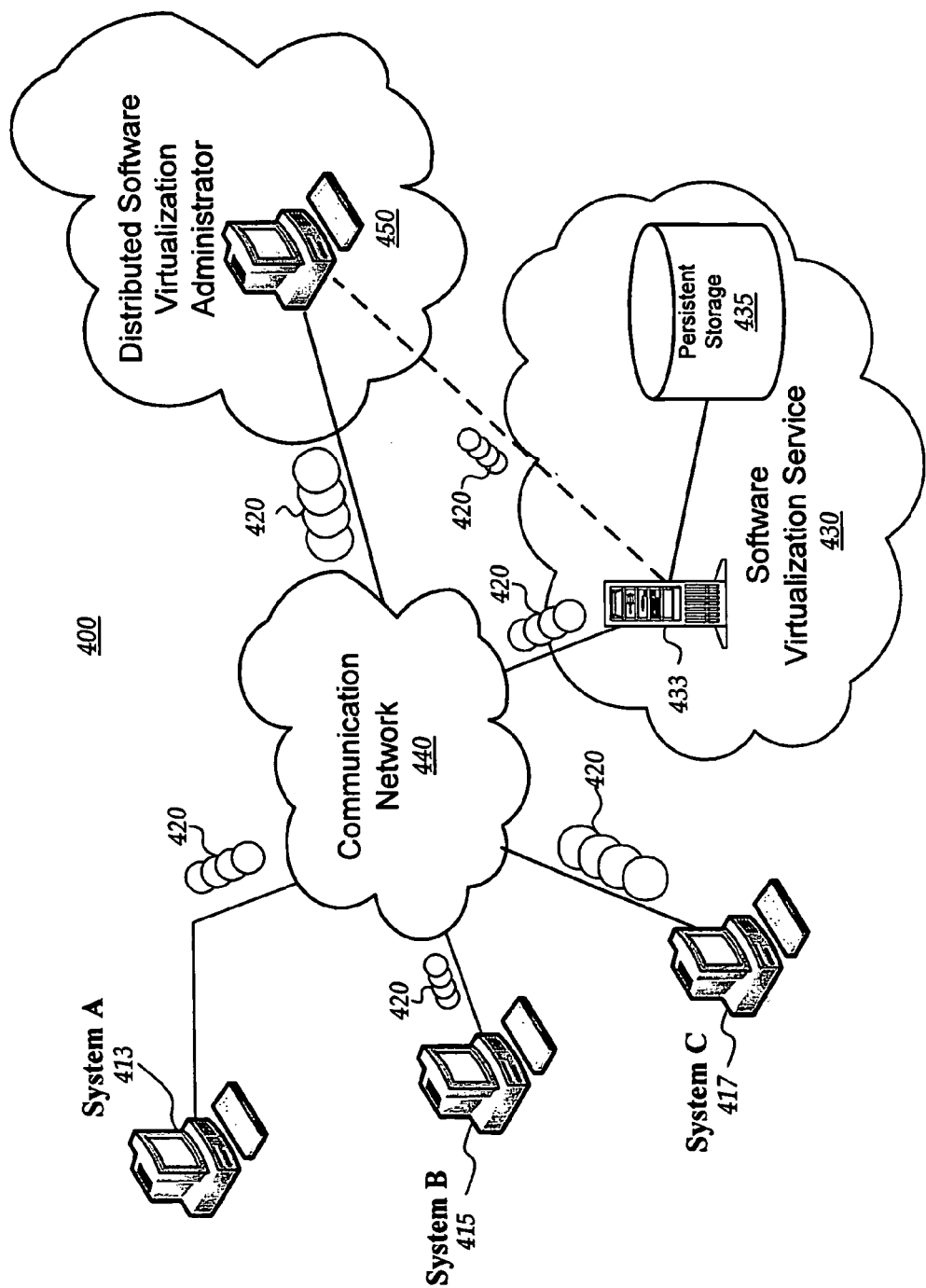
FIG. 4 illustrates another network of computing systems configured for distributed software virtualization in accordance with various embodiments of the present disclosure the computing device environment.

Referring now to FIG. 4, a suitable distributed application virtualization environment configured for a network 400 is shown in accordance with various embodiments of the present disclosure. The network 400 includes computing systems 413, 415, and 417 each coupled to a communication network 440. As shown, a distributed software virtualization service 430 and a distributed software virtualization administrator 450 are also communicatively coupled to the other computing device systems via the communication network 440. The distributed software virtualization service 430, administrator 450, and each computing device system may communicate notifications and/or requests 420 with one another using any suitable communication technologies, including suitable network communication technologies, devices, signals, and protocols capable of supporting the processes and communications described herein.

Communication network 440 may include any type, number, and configuration of networks capable of carrying communication signals between devices connected to the communication network 440, including but not limited to a local area network, a wide area network, a peer-to-peer network, a wireless network, a data network, an intranet, the Internet, and combinations or sub-combinations thereof. In other embodiments, the distributed software virtualization service 430, administrator 450, and the network computing systems (413-417) may communicate directly, such as over a communication bus or other communication link. Each of the network computing systems (413-417) may include both a distributed software management system configured to create and/or maintain at least one distributed virtual layer having at least one distributed application configured for operation by at least one other computing device and a distributed virtualization manager implemented in at least one of a software management module and computing device in the network computing systems (413-417). The distributed virtualization manager being configured to receive and generate distributed application layer data exchanged via notifications and/or requests 420 transmitted by the distributed software virtualization service 430.

In certain embodiments, for example, distributed software virtualization service 430 may include or be embodied on one or more server devices 433, which may be configured to operate server software such as Altiris® Notification Server™ software provided by Altiris, Inc., a division of Symantec Corporation. Distributed software virtualization service 430 may include and may be configured to execute computer readable instructions (e.g., one or more computer program products) embodied on one or more computer readable media. The computer readable instructions may be configured to direct execution of one or more user input, user output, parameter definition, parameter activation, parameter deployment, and automatic software virtualization operations. Accordingly, in certain embodiments, a user of distributed software virtualization service 430, such as an administrator 450 or other privileged user of the system 400, may utilize the distributed software virtualization service 430 to define parameters to be used to control automatic virtualization operations performed at one or more computing devices 413-417 or elsewhere in network 400, as described further below.

In certain embodiments, a user of a computing device 413-417, such as an administrator 450 or a privileged or non-privileged user in network 400 may utilize the computing device (413, 415, and/or 417) to define parameters to be used to control automatic virtualization operations performed at the computing device and/or elsewhere in network 400. A computing device (413, 415, and/or 417) may include any hardware (e.g., a processor) and computing instructions (e.g., one or more computer program products) capable of performing one or more of the processes described herein, including communicating with the distributed software virtualization service 430, receiving user input defining parameters, activating the distributed parameters, and automatically performing one of more virtualization operations based on the distributed parameters. Computing systems 413, 415, and 417 may include, but are in no way limited to, a personal computer, a workstation, a personal digital assistant, or any device having a processor, memory, input and output devices, and persistent storage.

Turning now to FIGS. 5-10, methods of the disclosure, in accordance with various embodiments, are described in terms of firmware, software, and/or hardware with reference to flow diagrams. Describing a method by reference to a flow diagram enables one skilled in the art to develop programs, including instructions to carry out the methods on suitably configured computer systems and electronic devices. In various embodiments, portions of the operations to be performed by a computer device system may constitute circuits, general purpose processors (e.g., micro-processors, micro-controllers, an ASIC, or digital signal processors (DSPs)), special purpose processors (e.g., application specific integrated circuits or ASICs), firmware (e.g., firmware that is used by a processor such as a micro-processor, a micro-controller, and/or a digital signal processor), state machines, hardware arrays, reconfigurable hardware, and/or software made up of executable instructions. The executable instructions may be embodied in firmware logic, reconfigurable logic, a hardware description language, a state machine, an application-specific integrated circuit (ASIC), or combinations thereof.

With respect to various embodiments using a software implementation (e.g., a hardware simulator), at least one of the processors of a suitably configured electronic communication device executes the instructions from a storage medium. The computer-executable instructions may be written in a computer programming language or executable code. If written in a programming language conforming to a recognized standard, such instructions may be executed on a variety of hardware platforms and may interface with a variety of operating systems. Although the various embodiments are not described with reference to any particular programming language, it will be appreciated that a variety of programming languages may be used to implement the teachings of the embodiments as described herein. Furthermore, it is common in the art to speak of software in one form or another (e.g., program, procedure, process, application, etc.) as taking an action or causing a result. Such expressions are merely a shorthand way of saying that execution of the software by a device causes the processor of the computer to perform an action or a produce a result.

Figure 5:
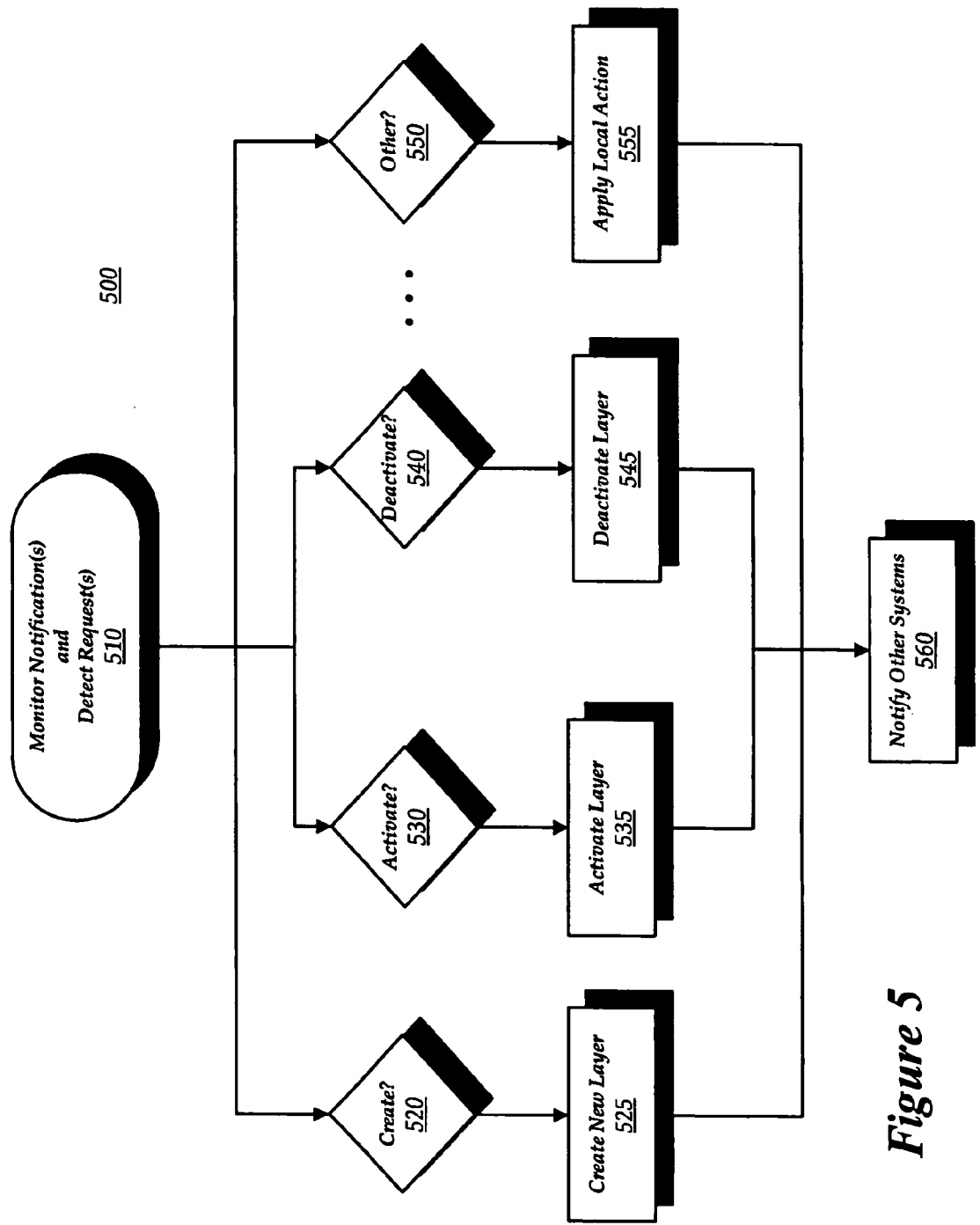
FIG. 5 illustrates a flow diagram view of a method of operation for distributed application virtualization in accordance with various embodiments.

Referring now to FIG. 5, a flow diagram view of a portion of a method of operation for distributed application virtualization is shown in accordance with various embodiments. Collectively, the detection, identification, creation, activation, deactivation, notification and other subsequent distributed virtualized operations may be referred to as the distributed application virtualization method/process 500. While FIG. 5 illustrates a virtualization operation according to one embodiment, other embodiments may omit, add to, reorder, and/or modify any of the shown virtualization operation in FIG. 5. The process 500 begins in block 510 upon detection of an operation request and/or notification from a distributed application layer.

Upon identifying a creation request or notification in block 520, the process 500 creates a distributed application layer in at least one system in the network in block 525. Once the layer is created, the process 500 notifies other systems in the network via a distributed software virtualization service of the recently activated distributed application layer in block 560. In one embodiment, the process also activates the recently created layer in block 525 and indicates the availability of the layer in the notification sent in block 560 to the other systems.

Upon identifying an activation request or notification in block 530, the process 500 activates a distributed application layer in at least one system in the network in block 535. Once the layer is active, the process 500 notifies other systems in the network via a distributed software virtualization service of the recently activated distributed application layer in block 560.

As previously indicated, in various embodiments, activation of a layer in block 535 may also automatically activate corresponding distributed application(s) on the system activating the layer. In one embodiment the process 500 identifies potential distributed resources by monitoring activation responses from local applications to see if any may also be associated with any of the activated distributed application layer(s). If there is a match, the newly activated local application may be added as a member to the activated distributed application layer. In one embodiment, upon detecting an activation notification from a distributed application associated with one of the active distributed application layers, the process 500 adds the active distributed application as a member to the active distributed application layer.

One embodiment activates the corresponding distributed applications across the network according to an activation order. The activation order may call for sequential activation of applications dependent on other applications within the layer and/or independently allow each system of the distributed application layer to activate corresponding applications in parallel.

Upon identifying a deactivation request or notification in block 540, the process 500 deactivates a distributed application layer in at least one system in the network in block 545. In one embodiment, the process 500 in block 545 also deactivates any corresponding active local distributed application(s) and/or corresponding active distributed application(s) across the network. Deactivation may also be performed according to a designated order by the process 500 in block 545.

Once the layer is deactivated, the process 500 notifies other systems in the network via a distributed software virtualization service of the recently deactivated distributed application layer in block 560. In one embodiment, upon receiving a deactivation notification at one of the other systems, the process 500 will also deactivate the distributed application layer and/or any associated applications.

Upon identifying a distributed virtualization operation request or notification in block 550, the process 500 applies the distributed virtualization operation in block 555 to at least one system, such as the local system, in the network. Once the desired distributed virtualization operation has been applied locally to the layer and/or applications in block 555, the process 500 notifies other systems in the network via a distributed software virtualization service of the recent activity distributed application layer in block 560. Examples of a distributed virtualization operation include activating a distributed application/layer, deactivating an active distributed application/layer, resetting a designated distributed application/layer, importing a received distributed application/layer, exporting a selected distributed application/layer, deleting a distributed application/layer, and combinations thereof including automatic ordered implementation of multiple distributed virtualization operations.

In various embodiments, the process 500 may conditionally perform an ordered execution of the distributed virtualization operation. More specifically, members of the distributed application layer may be assigned a priority level, dependency factor, or relative rank that allows for the process 500 to identify members of a given distributed application layer and perform operations according to the relative merit to other members of the layer. The relative order of each member associated with the distributed application layer may result in sequential, parallel, synchronized, asynchronous, or other selective order for execution and implementation. The order of execution may also be determined by the interdependence of members within the distributed application layer.

Figure 6:
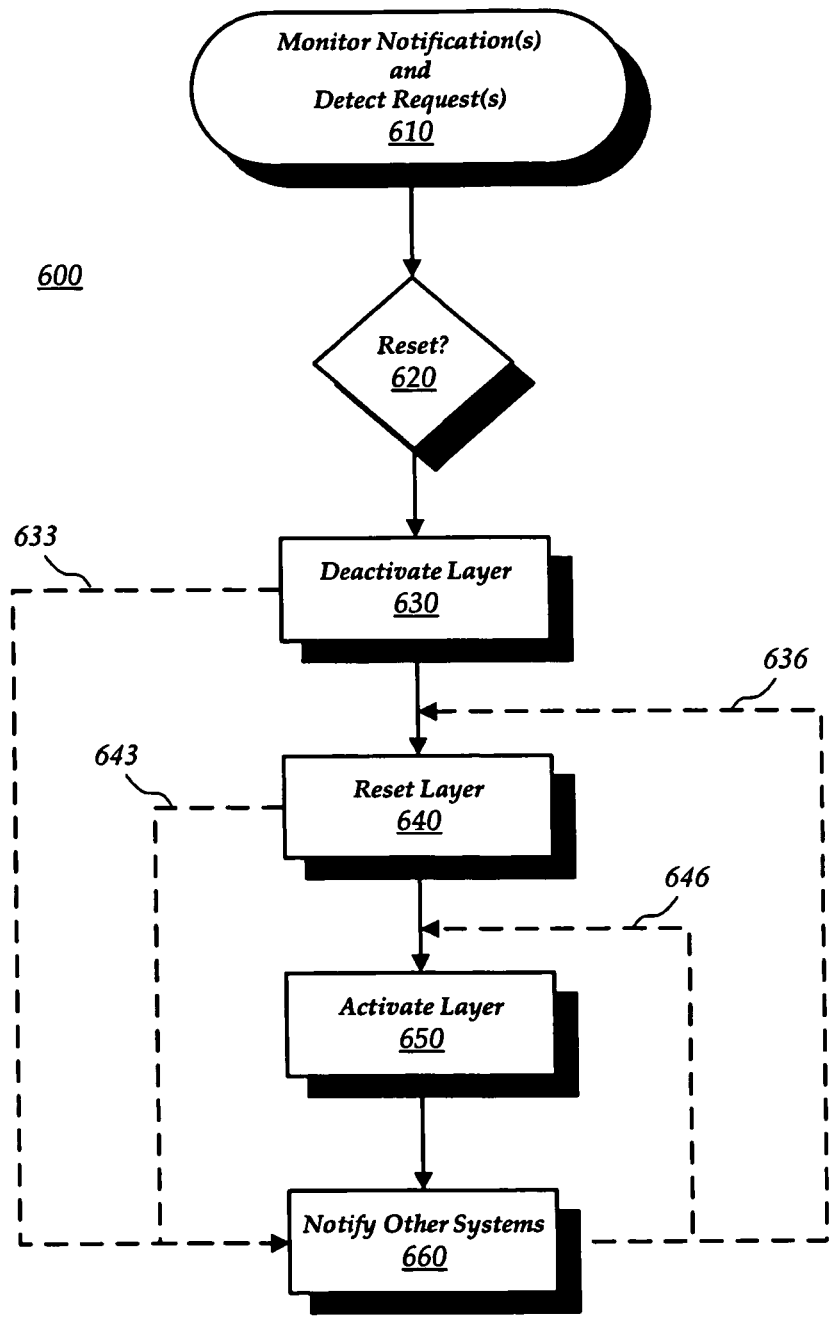
FIG. 6 illustrates a flow diagram view of a method of operation for resetting a distributed application layer in accordance with various embodiments.

Referring now to FIG. 6, a flow diagram view of a method of operation for resetting a distributed application layer is shown in accordance with various embodiments. Collectively, the distributed virtualized operations of detection, identification, deactivation, reset, activation, and notification may be referred to as the distributed application reset method/process 600. While FIG. 6 illustrates a reset operation according to one embodiment, other embodiments may omit, add to, reorder, and/or modify any of the shown reset operation in FIG. 6. The process 600 begins in block 610 upon detection of a reset operation request and/or reset notification from a distributed application layer.

Upon identifying a reset request or notification in block 620, the process 600 deactivates a distributed application layer in at least one system in the network in block 630. In one embodiment, the process 600 optionally notifies the other systems in the network via optional path 633 using the distributed software virtualization service in block 660 as to the deactivated status of the distributed application layer. Once deactivation is confirmed, the process 600 then returns to block 640 via optional path 636. This report and notify feature can be particularly useful when an ordered reset is necessary to identify when the next member may be deactivated.

In block 640, the process 600 initializes a designated distributed application layer back to reset the layer. In one embodiment, block 640 resets the distributed application layer back to a saved configuration state. In one embodiment, the initialization procedure frees or restarts the allocated layer resources. Various embodiments, while performing the reset operation, will unload from the layer and load each member application back into the layer. In one embodiment, the process 600 optionally notifies the other systems in the network via optional path 643 using the distributed software virtualization service in block 660 as to the recently reset status of the distributed application layer on the system. In one embodiment, the process 600 may also call for the other systems associated with the distributed application layer to initialize and/or reset any resources and/or member applications corresponding to the distributed application layer that is the target of the reset operation. Once the reset operation is confirmed to the other systems, in one embodiment, the process 600 then returns to activate the layer in block 650 via optional path 646.

In block 650, the process 600 activates the designated distributed application layer and notifies the other systems in the network using the distributed software virtualization service in block 660 as to the status of the distributed application layer.

In various embodiments, the process 600 the reset operation may result in restoring the designated distributed application layer and all corresponding distributed application(s) to a startup or initialization state. In one embodiment, the process 600 resets the designated distributed application layer and any corresponding distributed applications according to a designated reset order. For example, the designated reset order may indicate a sequential order through which applications need to be restarted. Alternatively, members of the distributed application layer may be assigned a priority level or rank that allows for ordered operations, including reset The order for resetting a layer or application may be based in part on dependencies and interdepencies between distributed assets within the distributed layer resulting in a sequentially dependent portion and a nonsequential independent portion for the reset order.

Figure 7:
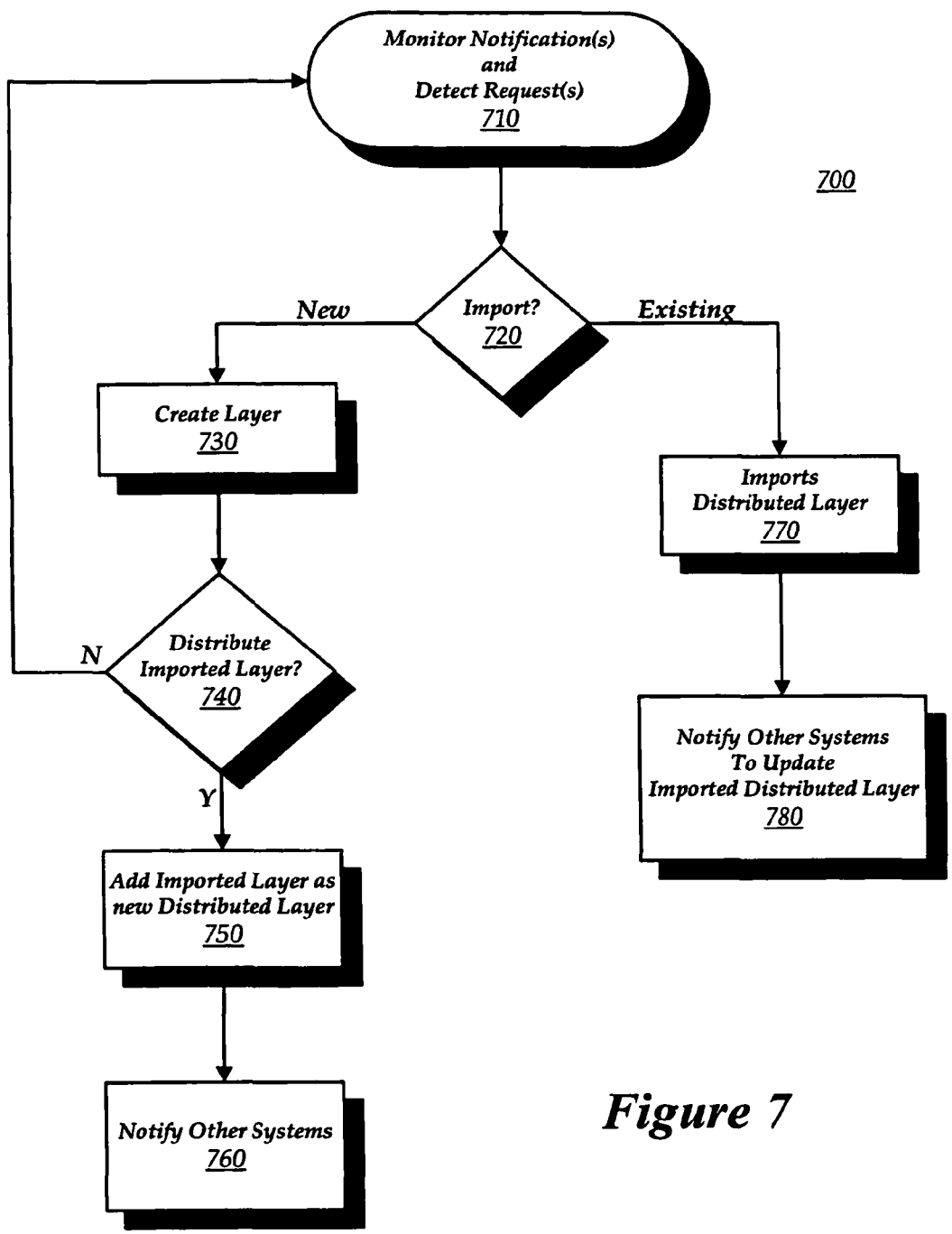
FIG. 7 illustrates a flow diagram view of a method of operation for importing a distributed application layer in accordance with various embodiments.

Referring now to FIG. 7, a flow diagram view of a method of operation for importing a distributed application layer is shown in accordance with various embodiments. Collectively, the detection, identification, creation, distribution, importation, notification and other subsequent distributed virtualized operations may be referred to as the distributed virtualization import method/process 700. While FIG. 7 illustrates an import operation according to one embodiment, other embodiments may omit, add to, reorder, and/or modify any of the shown import operation in FIG. 7. The process 700 begins in block 710 upon detection of an operation request and/or notification from a distributed application layer.

Upon identifying an import request or notification in block 720, the process 700 determines whether items to be imported already exist in some form on the network, such that the import operation may merely activate and/or supplement existing information about available distributed layer(s)/application(s)/member(s). In one embodiment, the import request may include layer(s), application(s), and/or member(s) that exist in the network, but are not necessarily recognized in the local system and are thus considered by the process 700 to be "existing" in block 720. Other layer(s), application(s), and/or member(s) not identified within the network and originating system are considered by the process 700 to be "new" in block 720.

In one embodiment, when importing "new" layer(s), application(s), and/or member(s) the process 700 first creates a new layer in block 730 based in part on import operation information received and/or solicited as a result of the received import request/notification in block 710. Among other things, the layer may include identification and configuration information about various layer applications, resources, or other members.

Once the layer is created, the process 700 determines whether to distribute the imported layer in query block 740. If the new layer is not to be distributed, the process returns to block 710 to monitor notifications and detect further requests. In one embodiment, distribution of the new layer is regulated and withheld until each of the layer members have been created and imported. In this manner partial or purely local layers are not distributed prematurely. If the process 700 determines in query block 740 that the imported layer should be distributed, then the new imported layer is added as distributed layer in block 750 visible to other systems in the same distributed layer and coupled to the network. Upon adding the imported layer as a distributed layer, the process 700 notifies the other systems in block 760. Notification of the other systems may include transmission of imported operation information including a distributed layer identification corresponding to the newly created distributed layer. In one embodiment, the notification in block 760 also includes identification information for associated application(s), and/or member(s) of the imported layer.

In one embodiment, the process 700 conducts the import operation for existing layer(s), application(s), and/or member(s) as determined in query block 720. Since at least one existing layer, application, and/or member may already be found on one of the systems in the network, the process 700 merely combines the imported information with the available items to form a distributed layer in block 770. For example, when the local system already includes an application that is used on the distributed layer, the import operation may synchronize the application with the distributed layer by importing the layer environment and linking the application to the layer identification information. In one embodiment, the members of the distributed layer may already exist on the network, but not exist locally so the received import operation causes the process 700 to either link or create the members necessary for the layer to exist locally.

Once the imported items have been added, the process 700 notifies the other systems in block 780 to update their existing distributed layer to include the local system and thereby joins the local system to the existing distributed layer. For example, one part of the notification process may include transmitting distributed layer identification information, such as information necessary to register existing members (e.g., applications and resources) available from the local system to the imported layer. The notification operation in block 780 may also include communication to determine if other network members are active on the distributed application layer. In one embodiment, an existing layer member of an originating system may be placed in a new distributed layer grouping based on distributed layer identification obtained by the process 700 in block 780. The originating system may also receive various responses to the update notification, such as identification notifications of various distributed layer members, applications, and resources associated with the imported layer on other systems that are now available to the originating system.

Figure 8:
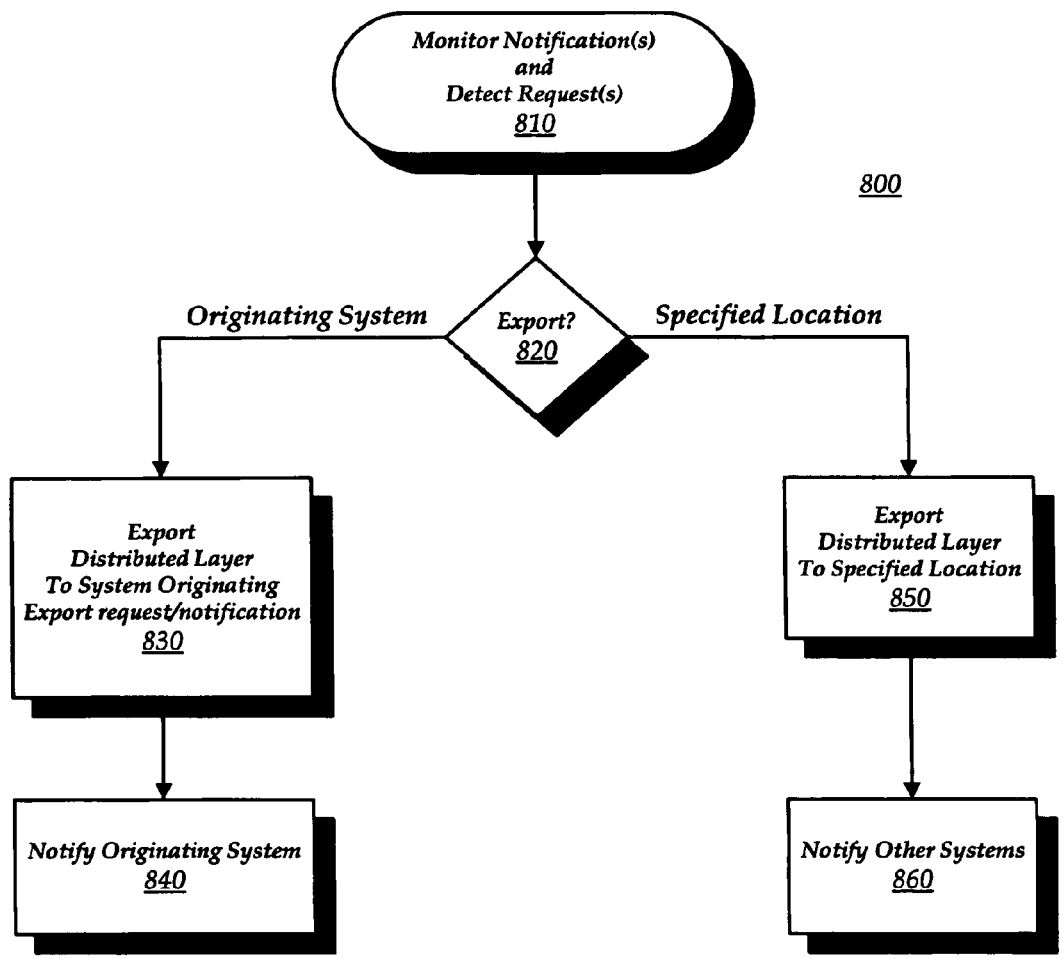
FIG. 8 illustrates a flow diagram view of a method of operation for exporting a distributed application layer in accordance with various embodiments.

Referring now to FIG. 8, a flow diagram view of a method of operation for exporting a distributed application layer is shown in accordance with various embodiments. Collectively, the detection, identification, exportation, notification and other subsequent distributed virtualized operations may be referred to as the distributed virtualization export method/process 800. While FIG. 8 illustrates an export operation according to one embodiment, other embodiments may omit, add to, reorder, and/or modify any of the shown export operation in FIG. 8. The process 800 begins in block 810 upon detection of an operation request and/or notification from a distributed application layer.

Upon identifying an export request or notification in block 820, the process 800 determines where objects of the export operation are to be sent. In one embodiment, the process 800 exports the export package, such as the identified distributed layer, to the system originating the export operation in block 830 and notifies/verifies the originating system of the completion of a successful export operation in block 840.

Alternatively, in accordance with the export request the process 800 may designate a specific location to transmit the export package, such as the identified distributed layer, in block 850. In one embodiment, the specified location may include a remote system outside of the distributed layer, a monitoring system, an administration system, and/or a backup system with persistent storage. The process 800 notifies and/or verifies with the other systems the completion of a successful export operation in block 860.

In one embodiment, the export request received in block 810 may also include guidance and/or direction as to packaging and transmitting requested contents of the export package, which may also include layer(s), application(s), and/or member(s) to be exported. In various embodiments, packaging may include collecting and combining layer members and corresponding identification information for export. The export request may also designate a variety of package features including desired export data format, export package size, and/or desired exportable programming code.

Figure 9:
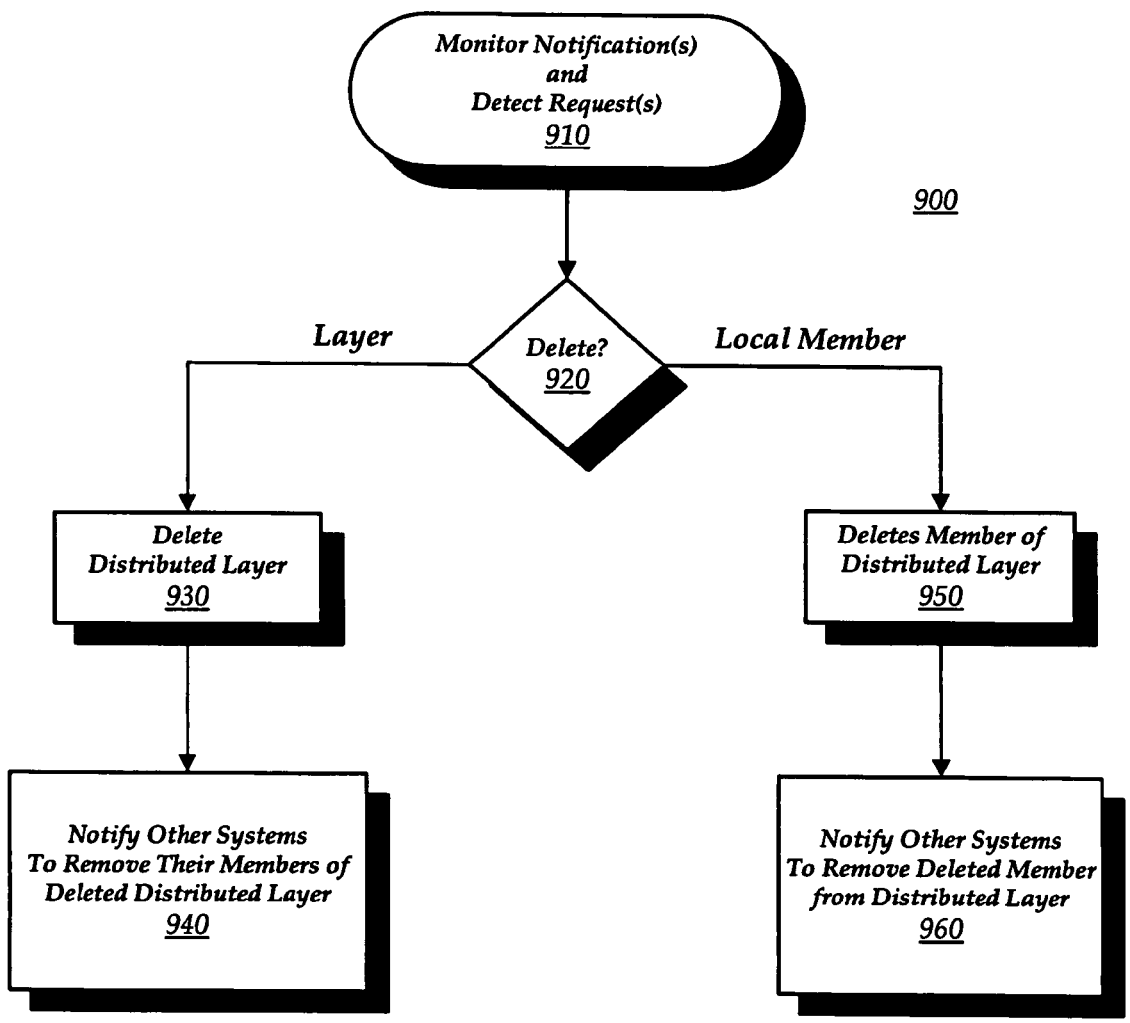
FIG. 9 illustrates a flow diagram view of a method of operation for removing a distributed application layer in accordance with various embodiments.

Referring now to FIG. 9, a flow diagram view of a method of operation for removing a distributed application layer is shown in accordance with various embodiments. Collectively, the detection, identification, deletion, notification and other subsequent distributed virtualized operations may be referred to as the distributed virtualization deletion method/process 900. While FIG. 9 illustrates a delete operation according to one embodiment, other embodiments may omit, add to, reorder, and/or modify any of the shown delete operation in FIG. 9. The process 900 begins in block 910 upon detection of a delete operation request and/or notification.

The process 900 identifies the desired scope of the delete operation request and/or notification in block 920. In various embodiments, the scope of the delete operation may include removal in block 930 of the entire distributed application layer. Once the local components of the distributed application layer have been removed, the process 900 notifies in block 940 the other systems in the network associated with the deleted distributed application layer to remove remaining layer(s), application(s), and/or member(s).

Alternatively, the scope of the delete operation request and/or notification may only include removal from the distributed application layer of individual components, such as local layer(s), application(s), and/or member(s). The process 900 selectively removes the individually identified member(s) from the layer and optionally deletes them entirely from the local system in block 950. Once the individual component of the distributed application layer has been removed, the process 900 notifies the other systems in the network associated with the deleted distributed application layer in block 960 to remove any remaining links to the deleted layer(s), application(s), and/or member(s).

Figure 10:
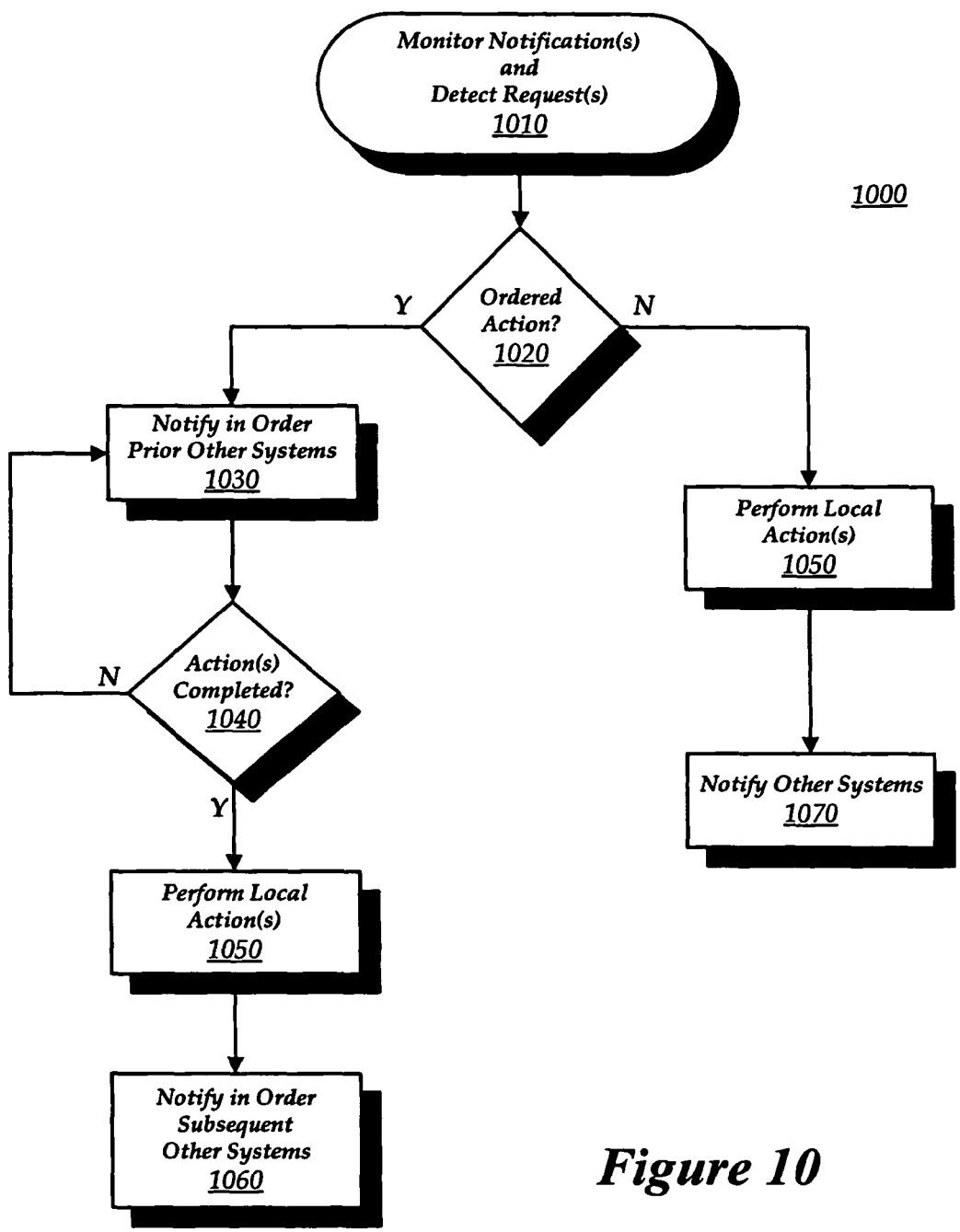
FIG. 10 illustrates a flow diagram view of a method of implementing an ordered distributed virtualization operation across a distributed application layer in accordance with various embodiments.

Referring now to FIG. 10, a flow diagram view of a method of ordered distributed virtualization across a distributed application layer is shown in accordance with various embodiments. Collectively, the detection, identification, notification, monitoring, execution, notification and other subsequent distributed virtualized operations may be referred to as the ordered distributed virtualization execution method/process 1000. While FIG. 10 illustrates an ordered operation according to one embodiment, other embodiments may omit, add to, reorder, and/or modify any of the shown ordered operation in FIG. 10. The process 1000 begins in block 1010 upon detection of an operation request and/or notification from a distributed application layer.

Upon identifying a potentially ordered request or notification in block 1020, the process 1000 determines whether ordered operation is available. In various embodiments, an ordered operation may be requested based on data dependency, operational stability, relative priority, or combination thereof.

If the process 1000 determines that an ordered operation may be performed, prior other systems are notified of the requested action in block 1030. Otherwise the process 1000 performs the requested local action in block 1050 and notifies the other systems of the completion of the local action in block 1070. In this manner an administrator-managed configuration, such as the illustrated network shown in FIG. 4, may accomplish ordered operations by sending individual operation requests from the administrator to each system for local action according to the desired order.

During an ordered operation, the process 1000 waits for requested prior actions to be completed in block 1040. Upon completion of each action, if additional actions are necessary by other prior systems the process 1000 notifies the next prior system of the requested action in block 1030. If no additional prior actions are necessary by other systems, the process 1000 performs the requested local action in block 1050. Once the local action has been completed, the process 1000 notifies any subsequent other systems in order in block 1060.

The preceding description has been presented only to illustrate and describe various embodiments with reference to the accompanying drawings. It will, however, be evident that various modifications and changes may be made thereto, and additional embodiments may be implemented, without departing from the scope of the invention as set forth in the claims that follow. The above description and accompanying drawings are accordingly to be regarded in an illustrative rather than a restrictive sense. Accordingly, this disclosure is intended to cover any adaptations or variations of the embodiments discussed herein. Therefore, it is manifestly intended that embodiments in accordance with the present disclosure be limited only by the claims and the equivalents thereof.

What is claimed is:

1. A method of distributed software application virtualization in a network of computer device systems, comprising:
   configuring at least two systems in the network for distributed application virtualization by providing each of the two systems with a distributed software virtualization service;
   generating a virtual distributed application layer that spans the two systems in the network;
   adding a distributed software application to the virtual distributed application layer;

providing mapping data that comprises information that identifies a destination file path in the virtual distributed application layer to which access requests are to be redirected;

activating the virtual distributed application layer in one of the two systems in the network and notifying the other of the two systems, via the distributed software virtualization service resident in the one of the two systems, of the activating of the virtual distributed application layer;

intercepting, at a filter driver of a virtualization engine, a first access request from one of the two systems for a file from an original file path in a base file system;

using, based on the virtual distributed application layer being activated, the mapping data to redirect the first access request from the original file path in the base file system to the destination file path in the virtual distributed application layer;

deactivating the activated virtual distributed application layer in the one of the two systems in the network and notifying the other of the two systems, via the distributed software virtualization service resident in the one of the two systems, of the deactivating of the virtual distributed application layer;

intercepting, at the filter driver, a second access request from one of the two systems for a file from the original file path in the base file system;

allowing, based on the virtual distributed application layer being deactivated, the second access request to pass through to the original file path in the base file system instead of being fulfilled from the destination file path in the virtual distributed application layer.

2. The method of claim 1, wherein the activating the virtual distributed application layer comprises activating the distributed software application on one or more of the at least two systems.

3. The method of claim 1, wherein the activating the virtual distributed application layer includes activating one or more corresponding distributed applications across the network according to an activation order, the one or more corresponding distributed applications comprising the distributed software application.

4. The method of claim 1, wherein the adding the distributed software application to the virtual distributed application layer comprises:
monitoring activation responses from local applications associated with the activated virtual distributed application layer;
while monitoring the activation responses, detecting an activation response, wherein the adding of the virtual distributed software application is performed in response to the detecting the activation response.

5. The method of claim 1, wherein the deactivating the activated virtual distributed application layer comprises notifying one or more of the at least two systems in the network associated with the activated virtual distributed application layer to deactivate at least one corresponding activated distributed application associated with the deactivated virtual distributed application layer according to a deactivation order.

6. The method of claim 1, further comprising resetting the virtual distributed application layer upon receiving a reset request.

7. The method of claim 6, wherein the resetting the virtual distributed application layer includes resetting at least one corresponding designated distributed application across the network according to a designated reset order.

8. The method of claim 6, wherein the resetting the virtual distributed application layer includes at least one of deactivating, initializing, and activating at least one corresponding designated distributed application of the virtual distributed application layer.

9. The method of claim 1, wherein:
the generating the virtual distributed application layer comprises importing the virtual distributed application layer to one of the at least two systems in the network upon receiving an import request, the method further comprising:
notifying, via the distributed software virtualization service resident in the system where the virtual distributed application layer was imported, at least one additional system from the at least two systems that the virtual distributed application layer has been imported.

10. The method of claim 1, wherein the adding the distributed software application to the virtual distributed application layer comprises adding a plurality of software applications to the virtual distributed application layer.

11. The method of claim 1, further comprising exporting the virtual distributed application layer from one of the at least two systems in the network upon receiving an export request; and
notifying, via the distributed software virtualization service resident in the system where the virtual distributed application layer was exported, at least one additional system from the at least two systems to export the virtual distributed application layer.

12. The method of claim 1, wherein file paths within the virtual distributed application layer are configured such that the file paths appear to the distributed software application as if they are located in the base file system.

13. The method of claim 1, wherein:
the activating the virtual distributed application layer comprises injecting the mapping data into the filter driver;
the deactivating the activated virtual distributed application layer comprises removing the mapping data from the filter driver.

14. The method of claim 1, further comprising:
deleting the distributed software application from one of the at least two systems in the network upon receiving a removal request; and
notifying, via the distributed software virtualization service resident in the system where the distributed software application was deleted, at least one additional system from the at least two systems to delete the distributed software application.

15. The method of claim 14, wherein the deleting the distributed software application includes deleting the virtual distributed application layer from one of the at least two systems in the network; and
notifying, via the distributed software virtualization service resident in the system where the virtual distributed application layer was deleted, at least one additional system from the at least two systems to remove the virtual distributed application layer.

16. A non-transitory computer-readable medium comprising one or more computer-readable instructions that, when executed by at least one processor of a computing device, cause the computing device to:
configure at least two systems in a network for distributed application virtualization by providing each of the two systems with a distributed software virtualization service;
generate a virtual distributed application layer that spans the two systems in the network;

add a distributed software application to the virtual distributed application layer;

provide mapping data that comprises information that identifies a destination file path in the virtual distributed application layer to which access requests are to be redirected;

activate the virtual distributed application layer in one of the two systems in the network and notify the other of the two systems, via the distributed software virtualization service resident in the one of the two systems, of the activating of the virtual distributed application layer;

intercept, at a filter driver of a virtualization engine, a first access request from one of the two systems for a file from an original file path in a base file system;

use, based on the virtual distributed application layer being activated, the mapping data to redirect the first access request from the original file path in the base file system to the destination file path in the virtual distributed application layer;

deactivate the activated virtual distributed application layer in the one of the two systems in the network and notify the other of the two systems, via the distributed software virtualization service resident in the one of the two systems, of the deactivating of the virtual distributed application layer;

intercept, at the filter driver, a second access request from one of the two systems for a file from the original file path in the base file system;

allow, based on the virtual distributed application layer being deactivated, the second access request to pass through to the original file path in the base file system instead of being fulfilled from the destination file path in the virtual distributed application layer.

17. The non-transitory computer-readable medium of claim 16, wherein the one or more computer-readable instructions further cause the computing device to reset the virtual distributed application layer upon receiving a reset request.

18. A distributed application virtualization system for facilitating software application virtualization in a network of computer device systems, the distributed application virtualization system comprising:

a software management module programmed to configure at least two systems in the network for distributed application virtualization by providing each of the two systems with a distributed software virtualization service;

a virtualization engine programmed to:

generate a virtual distributed application layer that spans the two systems in the network;

add a distributed software application to the virtual distributed application layer;

provide mapping data that comprises information that identifies a destination file path in the virtual distributed application layer to which access requests are to be redirected;

activate the virtual distributed application layer in one of the two systems in the network and notify the other of the two systems, via the distributed software virtualization service resident in the one of the two systems, of the activating of the virtual distributed application layer;

intercept, at a filter driver of the virtualization engine, a first access request from one of the two systems for a file from an original file path in a base file system;

use, based on the virtual distributed application layer being activated, the mapping data to redirect the first access request from the original file path in the base file system to the destination file path in the virtual distributed application layer;

deactivate the activated virtual distributed application layer in the one of the two systems in the network and notify the other of the two systems, via the distributed software virtualization service resident in the one of the two systems, of the deactivating of the virtual distributed application layer;

intercept, at the filter driver, a second access request from one of the two systems for a file from the original file path in the base file system;

allow, based on the virtual distributed application layer being deactivated, the second access request to pass through to the original file path in the base file system instead of being fulfilled from the destination file path in the virtual distributed application layer.

19. The system of claim 18, wherein the virtualization engine is programmed to activate the virtual distributed application layer by activating the distributed software application on one or more of the at least two systems.

20. The system of claim 18, wherein the virtualization engine is programmed to activate the virtual distributed application layer by activating one or more corresponding distributed applications across the network according to an activation order, the one or more corresponding distributed applications comprising the distributed software application.

* * * * *